(12) United States Patent
Otsuka

(10) Patent No.: US 6,611,889 B1
(45) Date of Patent: Aug. 26, 2003

(54) MONITOR AND CONTROL FOR MEDIA MANIPULATION

(75) Inventor: Toru Otsuka, Fujisawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 441 days.

(21) Appl. No.: 09/651,317

(22) Filed: Aug. 31, 2000

(30) Foreign Application Priority Data

Nov. 9, 1999 (JP) .......................................... 11-318817

(51) Int. Cl.$^7$ .............................................. G06F 13/38
(52) U.S. Cl. ........................................ 710/100; 341/100
(58) Field of Search ........................... 710/100, 52, 61; 370/366; 713/400; 700/1, 12, 258; 714/1, 48, 25, 47; 340/525, 524, 517; 348/14.07, 211.8, 180, 184; 345/716; 341/100

(56) References Cited

U.S. PATENT DOCUMENTS

| | | | | |
|---|---|---|---|---|
| 4,403,297 A | * | 9/1983 | Tivy | |
| 4,999,763 A | * | 3/1991 | Ousborne | |
| 5,168,267 A | * | 12/1992 | Trickle | |
| 5,250,761 A | * | 10/1993 | Koyanagi | |
| 5,687,098 A | * | 11/1997 | Grumstrup et al. | |
| 5,901,276 A | * | 5/1999 | Murahashi et al. | |
| 5,954,827 A | * | 9/1999 | Frank et al. | |
| 5,959,547 A | * | 9/1999 | Tubel et al. | |
| 5,960,381 A | * | 9/1999 | Singers et al. | |

FOREIGN PATENT DOCUMENTS

JP 10164775 * 6/1998

OTHER PUBLICATIONS

H. Garcia, A. Ray, R. Edwards, A Reconfigurable Hybrid System and Its Application To Power Plant Control, IEEE Transactions on Control Systems Technology, No. 2, Jun. 1995, pp. 157–170.*

* cited by examiner

Primary Examiner—Gopal C. Ray
(74) Attorney, Agent, or Firm—Pillsbury Winthrop LLP

(57) ABSTRACT

The present invention relates to a monitor device for a control system having a serial-parallel converter for receiving inputs of serial signals transmitted from a unit control section via serial lines and converting them into parallel signals, a synchronization signal-receiving section for receiving inputs of predetermined signals transmitted from the unit control section via the serial lines and specifying addresses at which the parallel signals are stored, based on states of the predetermined signals, a data buffer for storing at least the parallel signals at the addresses specified by the synchronization signal-receiving section, and a CPU for providing control such that predetermined displays are provided on a CRT based on the stored signals.

11 Claims, 22 Drawing Sheets

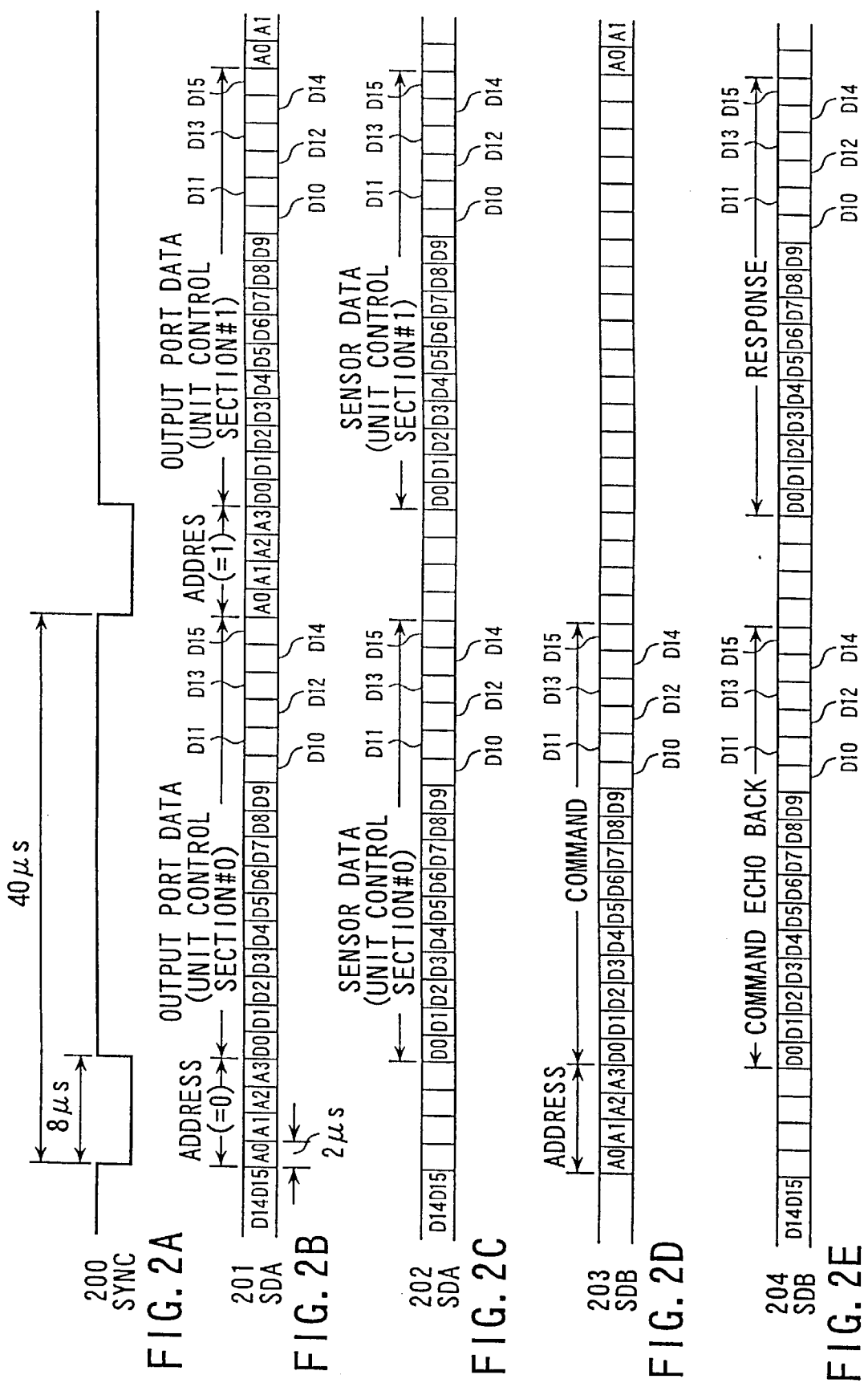

FIG. 4B

OUTPUT PORT DATA

| | D07 | D06 | D05 | D04 | D03 | D02 | D01 | D00 |
|---|---|---|---|---|---|---|---|---|
| 00H | 00H | 00H | 00H | 00H | 00H | 00H | 00H | 00H |
| 01H | 007 | 006 | 005 | 004 | 003 | 002 | 001 | 000 |
| 02H | 015 | 014 | 013 | 012 | 011 | 010 | 009 | 008 |
| 03H | S18-1 | S17-1 | S16-1 | S15-1 | S14-1 | S13-1 | S12-1 | S11-1 |

FIG. 4C

SENSOR DATA

| | D07 | D06 | D05 | D04 | D03 | D02 | D01 | D00 |
|---|---|---|---|---|---|---|---|---|
| 00H | 00H | 00H | 00H | 00H | 00H | 00H | 00H | 00H |
| 01H | 107 | 106 | 105 | 104 | 103 | 102 | 101 | 100 |
| 02H | 115 | 114 | 113 | 112 | 111 | 110 | 109 | 108 |
| 03H | S18 | S17 | S16 | S15 | S14 | S13 | S12 | S11 |

FIG. 4D

COMMAND DATA

| | D07 | D06 | D05 | D04 | D03 | D02 | D01 | D00 |
|---|---|---|---|---|---|---|---|---|
| 00H | UNIT CONTROL SECTION ADDRESS | | | | | | | |
| 01H | C07 | C06 | C05 | C04 | C03 | C02 | C01 | C00 |
| 02H | C15 | C14 | C13 | C12 | C11 | C10 | C09 | C08 |
| 03H | S18-33 | S17-33 | S16-33 | S15-33 | S14-33 | S13-33 | S12-33 | S11-33 |

FIG. 4E

RESPONSE DATA

| | D07 | D06 | D05 | D04 | D03 | D02 | D01 | D00 |
|---|---|---|---|---|---|---|---|---|
| 00H | 00H | 00H | 00H | 00H | 00H | 00H | 00H | 00H |
| 01H | R07 | R06 | R05 | R04 | R03 | R02 | R01 | R00 |
| 02H | R15 | R14 | R13 | R12 | R11 | R10 | R09 | R08 |
| 03H | S18-49 | S17-49 | S16-49 | S15-49 | S14-49 | S13-49 | S12-49 | S11-49 |

FIG. 7
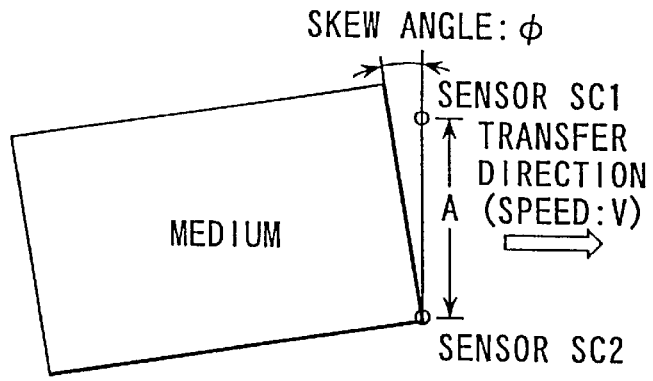
FIG. 9A
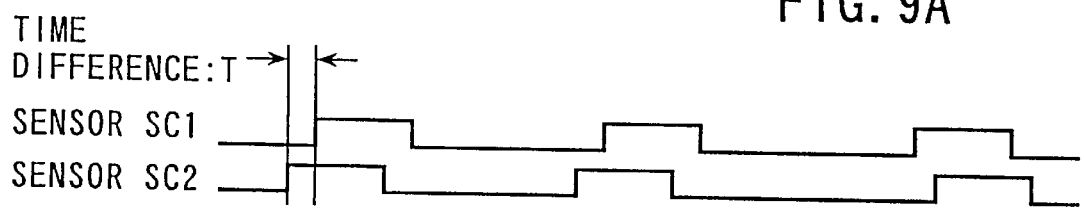
FIG. 9B

MARK CURSOR
(MEASUREMENT
START POSITION)

CURSOR
(MEASUREMENT
START POSITION)

SENSOR SC1
SENSOR SC2

FIG. 11

MEASUREMENT SETTING

LEFT SC
RIGHT SC

INTER-SC DISTANCE ☐ mm
TRANSFER SPEED ☐ m/sec.

[DISPLAY] [STOP] [LEFT⇔RIGHT]

FIG. 12A

SKEW MEASUREMENT RESULT

LEFT SC
RIGHT SC

| No. | TIME DIFFERENCE (ms) | SKEW ANGLE (°) |
|---|---|---|
| | | |

MINIMUM
MAXIMUM
AVERAGE
NUMBER

[DISTRIBUTION]
[GRAPH]
[SAVE]
[END]

FIG. 12B

MONITOR AND CONTROL FOR MEDIA MANIPULATION

CROSS-REFERENCE TO RELATED APPLICATIONS

This application is based upon and claims the benefit of priority from the prior Japanese Patent Application No. 11-318817, filed Nov. 9, 1999, the entire contents of which are incorporated herein by reference.

BACKGROUND OF THE INVENTION

The present invention relates to a monitor device for a control system consisting of a main control section and a plurality of unit control sections each having a sensor connected thereto.

Medium transfer devices for transferring media, for example, paper conventionally include a large number of actuators for separating or moving medium and a large number of sensors for sensing the media for movement. It is thus critical how signals from these sensors are transmitted to a CPU and these actuators are transmitted to a CPU.

Various techniques for multiplexing and transmitting information via serial lines have been proposed for such control systems. To debug control programs for these control systems or analyzing them for errors, it is effective and common to externally reference variations in sensor state and results of control and operation of the actuators.

In an apparatus having a larger number of sensors and actuators mounted therein, however, it is very cumbersome to connect probes of a measuring instrument to corresponding signal lines at the terminal of each sensor or actuator.

Further, in some cases, the probes cannot be connected without special modifications because a substrate with a circuit mounted thereon is positioned where it cannot be externally accessed, or probe lines of a typical measuring instrument may have an insufficient length to connect to all signals due to a large size of the apparatus.

BRIEF SUMMARY OF THE INVENTION

The present invention is provided in view of the above problems, and it is an object thereof to provide a monitor device for a control system that monitors signals on serial lines to obtain and display information on sensors and actuators in order to allow operational conditions of the control system to be observed.

To attain this object, according to a first aspect of the present invention, there is provided a monitor device for a control system for monitoring operational conditions of an apparatus comprising a control section and a controlled section that are connected together via serial lines, the control section indicating control targets and contents to the controlled section via the serial lines, the controlled section returning its conditions to the control section via the serial lines, the monitor device being characterized by comprising input means for receiving inputs of serial signals transmitted from the controlled section via the serial lines and converting them into parallel signals, storage means for receiving inputs of predetermined signals transmitted from the controlled section via the serial lines and storing the parallel signals therein, and display means for providing predetermined displays based on the signals stored in the storage means.

According to a second aspect of the present invention, there is provided a monitor device for a control system for monitoring operational conditions of an apparatus comprising a control section and a controlled section that are connected together via serial lines, the control section indicating control targets and contents to the controlled section via the serial lines, the controlled section returning its conditions to the control section via the serial lines, the monitor device being characterized by comprising input means for receiving inputs of serial signals transmitted from the control and controlled sections via the serial lines and converting them into parallel signals, storage means for receiving inputs of predetermined signals transmitted from the control and controlled sections via the serial lines and storing the parallel signals therein, and display means for providing predetermined displays based on the signals stored in the storage means, the monitor device being characterized in that the signals transmitted from the control and controlled sections via the serial lines include signals concerning an output port ON/OFF state of the controlled section and an ON/OFF state of a sensor connected to the controlled section, and in that the display means displays the sensor ON/OFF state and the output port ON/OFF state on the same time axis.

According to a third aspect of the present invention, there is provided a monitor device for a control system for monitoring operational conditions of an apparatus comprising a control section and a controlled section that are connected together via serial lines, the control section indicating control targets and contents to the controlled section via the serial lines, the controlled section returning its conditions to the control section via the serial lines, the monitor device being characterized by comprising transmission means for transmitting from the control section commands for controlling the controlled section and transmitting responses from the controlled section to the control section, input means for receiving inputs of serial signals transmitted from the control and controlled sections via the serial lines and of the command and response signals transmitted by the transmission section via the serial lines and converting these signals into parallel signals, storage means for receiving inputs of predetermined signals transmitted from the control and controlled sections via the serial lines and storing the parallel signals therein, and display means for providing predetermined displays based on the signals stored in the storage means, the monitor device being characterized in that the signals transmitted from the control and controlled sections via the serial lines include signals concerning output ports ON/OFF state of the controlled section and ON/OFF state of sensor connected to the controlled section, and in-that the display means displays information on the commands and responses input via the transmission means on the same time axis as for the sensor ON/OFF state and the output port ON/OFF state.

According to a fourth aspect of the present invention, there is provided a monitor device for a control system for monitoring operational conditions of an apparatus comprising a control section and a controlled section having predetermined media transferred therethrough and having sensors for sensing transfer of the media, the control and controlled sections being connected together via serial lines, the control section indicating control targets and contents to the controlled section via the serial lines, the controlled section returning at least outputs from the sensors to the control section via the serial lines, the monitor device being characterized by comprising input means for receiving inputs of the output signals from the sensors transmitted from the controlled section via the serial lines and converting them into parallel signals, storage means for storing the output signals from the sensors transmitted from the controlled section via the serial lines, display means for providing predetermined displays based on the signals stored in the storage means, specification means for specifying on the display means at least either a desired sensor or measuring range, and control means for providing control such that an inclination of the medium, an interval between the media, a time required for the medium to pass, and a time required for a transfer between the sensors are calculated and displayed on the display means based on variations in the output of the sensor when a plurality of media are transferred through a position of the sensor specified by the specification means.

According to a fifth aspect of the present invention, there is provided a monitor device for a control system for monitoring operational conditions of an apparatus comprising a control section and a controlled section that are connected together via serial lines, the control section indicating control targets and contents to the controlled section via the serial lines, the controlled section returning its conditions to the control section via the serial lines, the monitor device being characterized by comprising transmission means for transmitting from the control section commands for controlling the controlled section and transmitting responses from the controlled section to the control section, input means for receiving inputs of serial signals transmitted from the control and controlled sections via the serial lines and of the command and response signals transmitted by the transmission section via the serial lines and converting these signals into parallel signals, storage means for receiving inputs of predetermined signals transmitted from the control and controlled sections via the serial lines and storing the parallel signals therein, display means for providing predetermined displays based on the signals stored in the storage means, specification means for specifying a command and a response to be retrieved, and control means for providing control such that the command and response specified by the specification means are retrieved from the storage means and such that time zone data including a point of time when the command or the response was transmitted is displayed on the display means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a timing chart showing a communication format (details) of data 200;

FIG. 2B is a timing chart showing a communication format (details) of data 201;

FIG. 2C is a timing chart showing a communication format (details) of data 202;

FIG. 2D is a timing chart showing a communication format (details) of data 203;

FIG. 2E is a timing chart showing a communication format (details) of data 204;

FIG. 4B is a diagram showing the structure of output port data;

FIG. 4C is a diagram showing the structure of sensor data;

FIG. 4D is a diagram showing the structure of command data;

FIG. 4E is a diagram showing the structure of response data;

FIG. 7 is a diagram showing a signal area display selection screen;

FIG. 9A is a diagram showing the relationship between a skew in a medium and a sensor;

FIG. 9B is a diagram showing variations in sensor state observed when three medium have been transferred;

FIG. 11 is a diagram showing how a measurement range is specified;

FIG. 12A is a diagram showing a measurement setting screen;

FIG. 12B is a diagram showing a skew measurement result screen;

DETAILED DESCRIPTION OF THE INVENTION

An embodiment of the present invention will be described below with reference to the drawings.

Figure 1A:
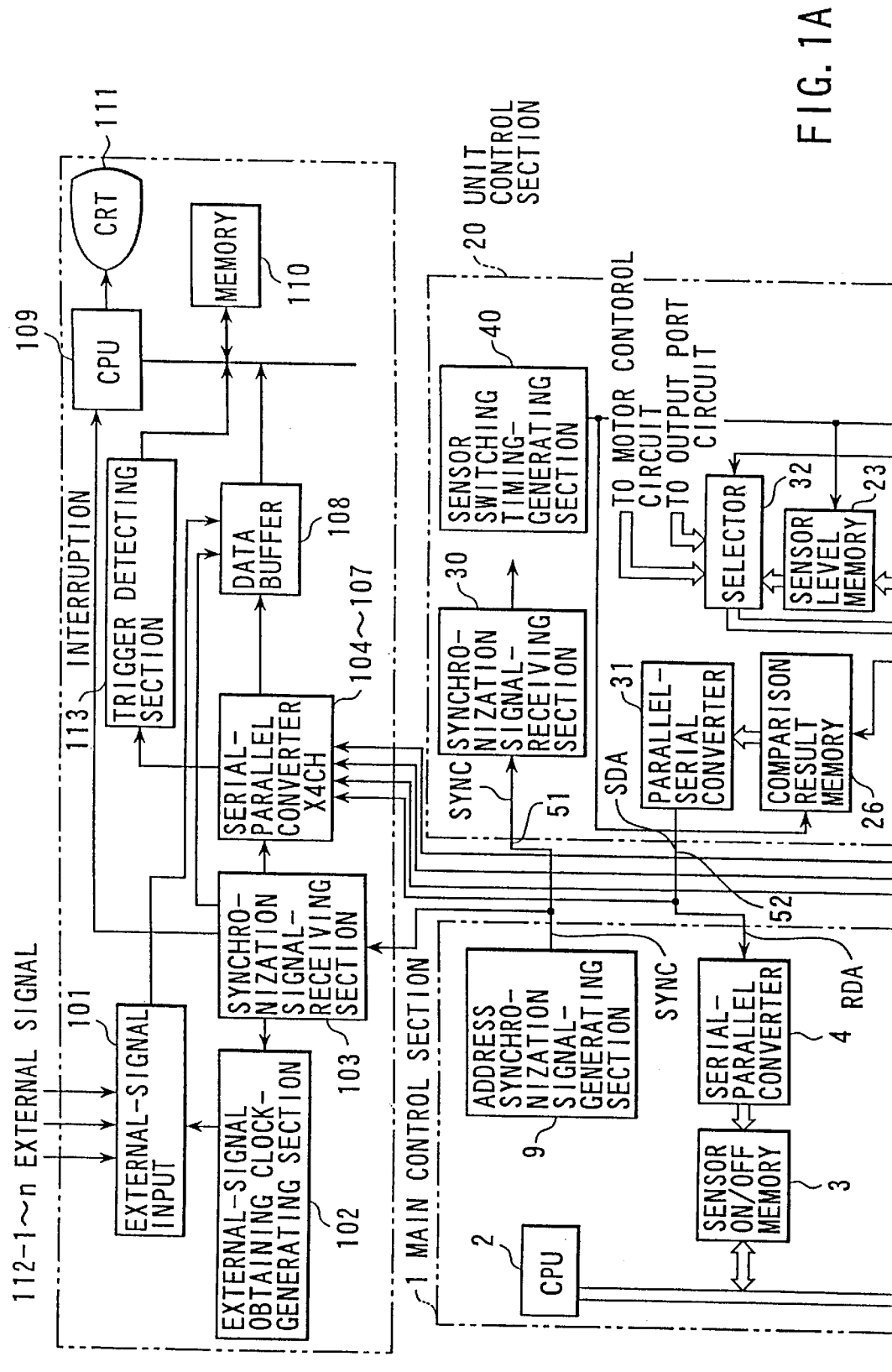
FIGS. 1A and 1B are functional block diagrams showing the entire configuration of a control system and a monitor device for the control system according to an embodiment of the present invention.
Figure 1B:
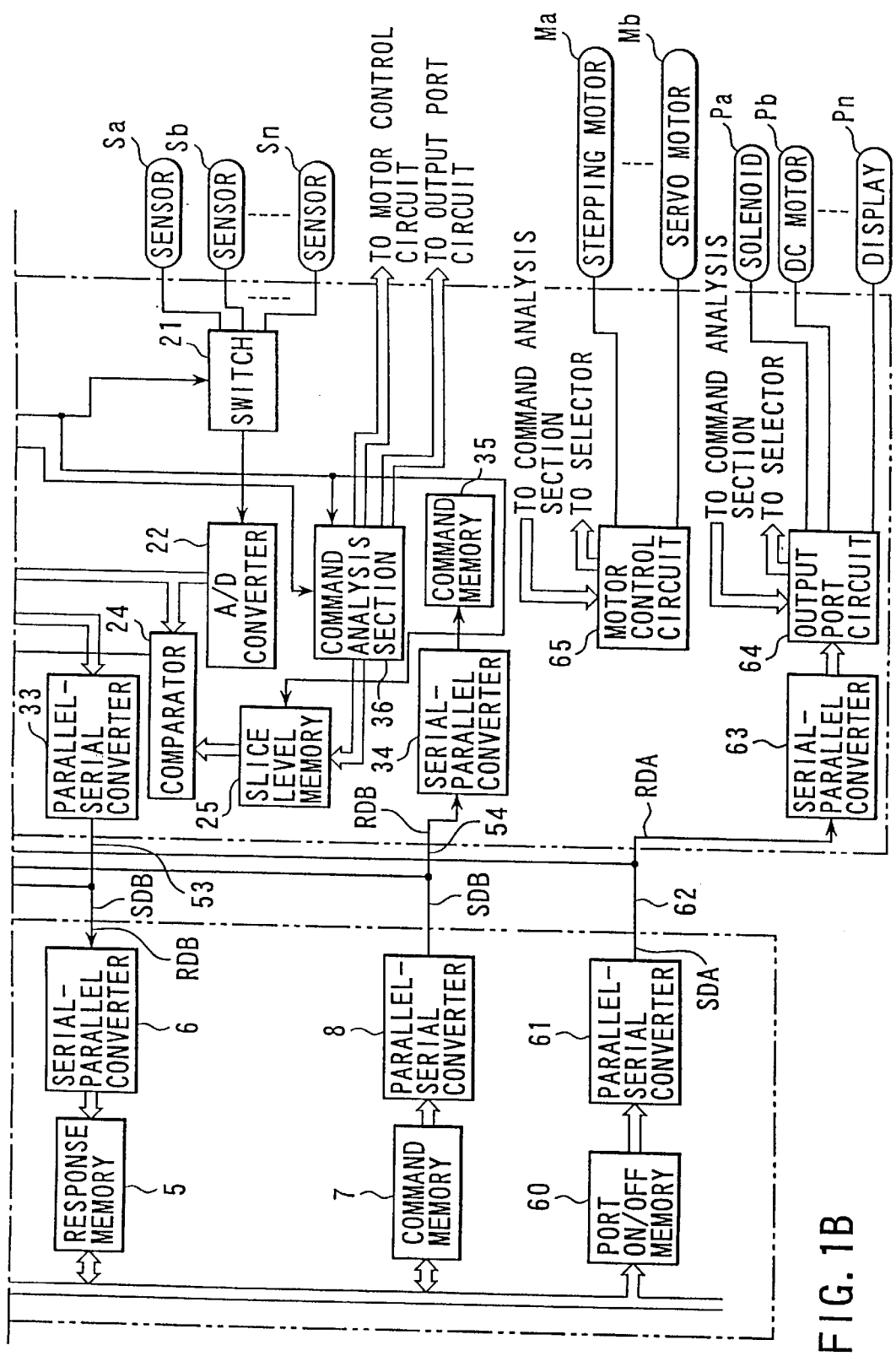
Figure 3:
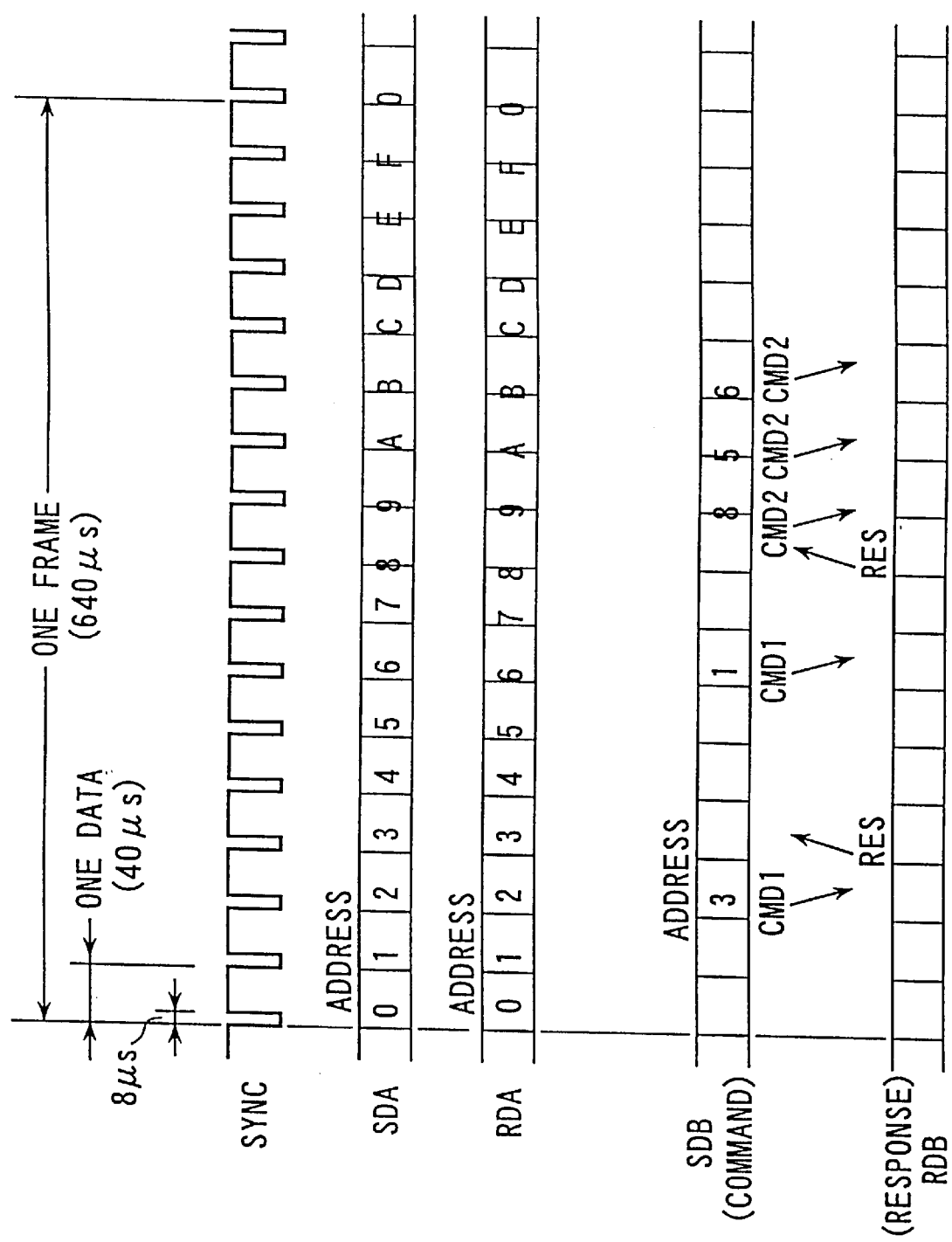
FIG. 3 is a timing chart showing a communication format (for one frame)

FIGS. 1A and 1B are functional block diagrams showing the entire configuration of a control system and a monitor device for the control system according to the embodiment of the present invention.

As shown in FIGS. 1A and 1B, a main control section 1 comprises a CPU 2, that is, a central processing unit. The CPU 2 has a sensor on/off memory 3, a response memory 5, a command memory 7, and a port ON/OFF memory 60 connected thereto.

The sensor on/off memory 3 is connected to a serial line 52 via a serial-parallel converter 4. The response memory 5 is connected to a serial line 53 via a serial-parallel converter 6.

The command memory 7 is connected to a serial line 54 via a parallel-serial converter 8. The port ON/OFF memory 60 is connected to a serial line 62 via a parallel-serial converter 61. In addition, a main control section comprises an address synchronization signal-generating section 9 connected to a serial line 51.

On the other hand, a unit control section 20 comprises a switch 21 as selection means, which has a plurality of sensors Sa, Sb, . . . Sn connected thereto.

The switch 21 repeats time division scanning based on timing signals supplied by a sensor switching timing-generating section 40 and sequentially selects and outputs signals from each sensor (hereafter referred to as "sensor signals").

Each sensor signal selected by the switch 21 has its level converted into digital data by an A/D converter 22, so that the digital data is held in a sensor level memory 23 as sensor level data while being supplied to a comparator 24.

The comparator 24 compares each sensor level data from the A/D converter 22 with a plurality of slice levels previously held in a slice level memory 25. The result of the comparison is held in a comparison result memory.

The slice level memory 25 sequentially outputs a slice level corresponding to each sensor in accordance with the same timings as in the scanning by the switch 21, based on timing signals supplied by a sensor switching timing-generating section 40.

The comparison results in the comparison result memory 26 are sequentially output in response to timing signals (not shown) independent of the sensor scanning and are each converted into a serial signal by a parallel-serial converter 31. The serial signal obtained by the conversion is transmitted to the serial-parallel converter 4 in the main control section 1.

The sensor level data in the sensor level memory 23 are sequentially output in response to timing signals (not shown) independent of the sensor scanning and are then selected by a selector 32 operative in response to indications from a command analysis section 36, described below. The selected data is converted into a serial signal by a parallel-serial converter 33. The serial signal obtained in this manner is transmitted to the serial-parallel converter 6.

A serial-parallel converter 34 parallel-converts a command transmitted from the serial-parallel converter 6 in the main control section 1 via the serial line 53. Then, the parallel-converted command is held in a command memory 35 and the contents held in this memory are analyzed by the command analysis section 36.

The command analysis section 36 analyzes a predetermined command in the command memory 35 to give an indication to the selector 32 in order to transmit the sensor level data in the sensor level memory 23 to the main control section 1.

In accordance with the instruction from an instruction from the command analysis section 36, the selector 32 selects and outputs either the data read out from the sensor level memory 23 or the command supplied by the command analysis section 36 (this is a return command for echo back check).

Further, the command analysis section 36 analyzes a plurality of slice levels from a predetermined command in the command memory 35 and allows the levels to be held in the slice level memory 25.

Additionally, on receiving a command transmitted from the main control section 1, the command analysis section 36 immediately returns a command with the same contents as the received command to the main control section 1 via the selector 32 and the parallel-serial converter 33.

Further, a synchronization signal-receiving section 30 in FIG. 30 is connected to the address synchronization signal-generating section 9 of the main control section 1 to receive synchronization signals supplied by the address synchronization signal-generating section 9.

Then, the operation of a motor control circuit will be explained.

The motor control circuit 65 is controlled by providing it with parameters such as a motor initial speed, a maximum speed, an acceleration rate, a deceleration rate, and an operation quantity and with commands such as operation start and operation stop. The CPU 2 writes to the command memory 7 parameters and commands to transmit to the motor control circuit 65.

The parallel-serial converter 8 serializes information including parameters and commands and transmits the serialized information to the serial-parallel converter 34 via the serial line 54. The parameters and commands, which have been parallelized by the serial-parallel converter 34, are then written to the command memory 35 and analyzed by the command analysis section 36 similarly to sensor circuit control commands (a sensor level read and a slice level setting commands). If the parameters and commands are to be sent to the motor control circuit 65, they are transmitted to the motor control circuit 65.

The motor control circuit 65 performs operations in accordance with the parameters and commands transmitted as described above. If the parameters and commands require operation results to be returned, such results are transmitted to the selector 32.

The command analysis section 36 simultaneously controls the selector 32 to transmit the operation results from the motor control circuit 65 to the parallel-serial converter 33. As a result, the operation results are stored in the response memory 5 so as to be read by the CPU 2.

Next, the operation of the output port circuit 64 will be described.

To turn on an output port, the CPU 2 writes "1" to the port ON/OFF memory 60 at an address corresponding to this output port, whereas to turn off the output port, the CPU 2 writes "0" to the port ON/OFF memory 60. The parallel-serial converter 61 serializes the contents of the port ON/OFF memory 60 and transmits them to the serial-parallel converter 63 via the serial line 62. The output port ON/OFF information, which has been parallelized by the serial-parallel converter 63, is read by the output port circuit 64, which then sets an output of the predetermined port in accordance with the output port ON/OFF information. As described in the motor control circuit 65, if operation results are required, corresponding data is transmitted to the response memory 5.

Next, a monitor section 100 will be described in detail.

The monitor section is a characteristic part corresponding to the monitor device for a control system according to this embodiment.

In the following description, the communication format shown in FIGS. 2A to 2E will be referenced as appropriate.

In the monitor section 100, an external-input section 101 for receiving external signals 112-1 to n has its output connected to an input of a data buffer 108. Further, a synchronization signal-receiving section 103 connected to the serial line 51 has its output connected to inputs of an external-signal-obtaining clock-generating section 102, a CPU 109, the data buffer 108, and serial-parallel converters 104 to 107.

The external-signal-obtaining clock-generating section 102 has its output connected to an input of the external-signal input section 101, and the serial-parallel converters 104 to 107 have their outputs connected to the data buffer 108 and to the input of the CPU 109 via a trigger detecting section 109. Additionally, the CPU 109 has the data buffer 108, a memory 110, and a CRT 111 connected thereto.

In this configuration, sensor ON/OFF information transmitted between the parallel-serial converter 31 and the serial-parallel converter 4, responses transmitted between the parallel-serial converter 33 and the serial-parallel converter 6, commands transmitted between the parallel-serial converter 8 and the serial-parallel converter 34, and port ON/OFF information transmitted between the parallel-serial converter 61 and the serial-parallel converter 63 are each input to a corresponding one of the serial-parallel converters 104 to 107 where it is parallel-converted and stored in the data buffer 108.

At the same time as the storage, the synchronization signal-receiving section 103 communicates the waveform of a SYNC signal 200 (see FIG. 2A) to the serial-parallel converters 104 to 107.

That is, when the SYNC signal is at a Low level, the synchronization signal-receiving section 103 obtains data 201 on the serial line 62 to recognize it as unit control section addresses. This address value is communicated to the data buffer 108.

The data buffer 108 records output port data and sensor data 202 (see FIG. 2C) from the serial-parallel converters 104 to 107, at addresses in accordance with the address value.

The serial-parallel converters 104 to 107 starts serial-parallel conversions of the output port data and sensor data using a rising edge of the SYNC signal as a start point. A command 203 (see FIG. 2D) and a response 204 (see FIG. 2E) requires their addresses to be recorded in the data buffer 108 with the data because their destination does not appear orderly but randomly.

The external-signal input section 101 obtains signals other than those signals that are transmitted between the main control section 1 and the unit control section 20. The external-signal input section 101 outputs "1" when signals 121-1 to n each have a value larger than or equal to a threshold, while outputting "0" when the signals each have a value smaller than the threshold.

Figure 4A:
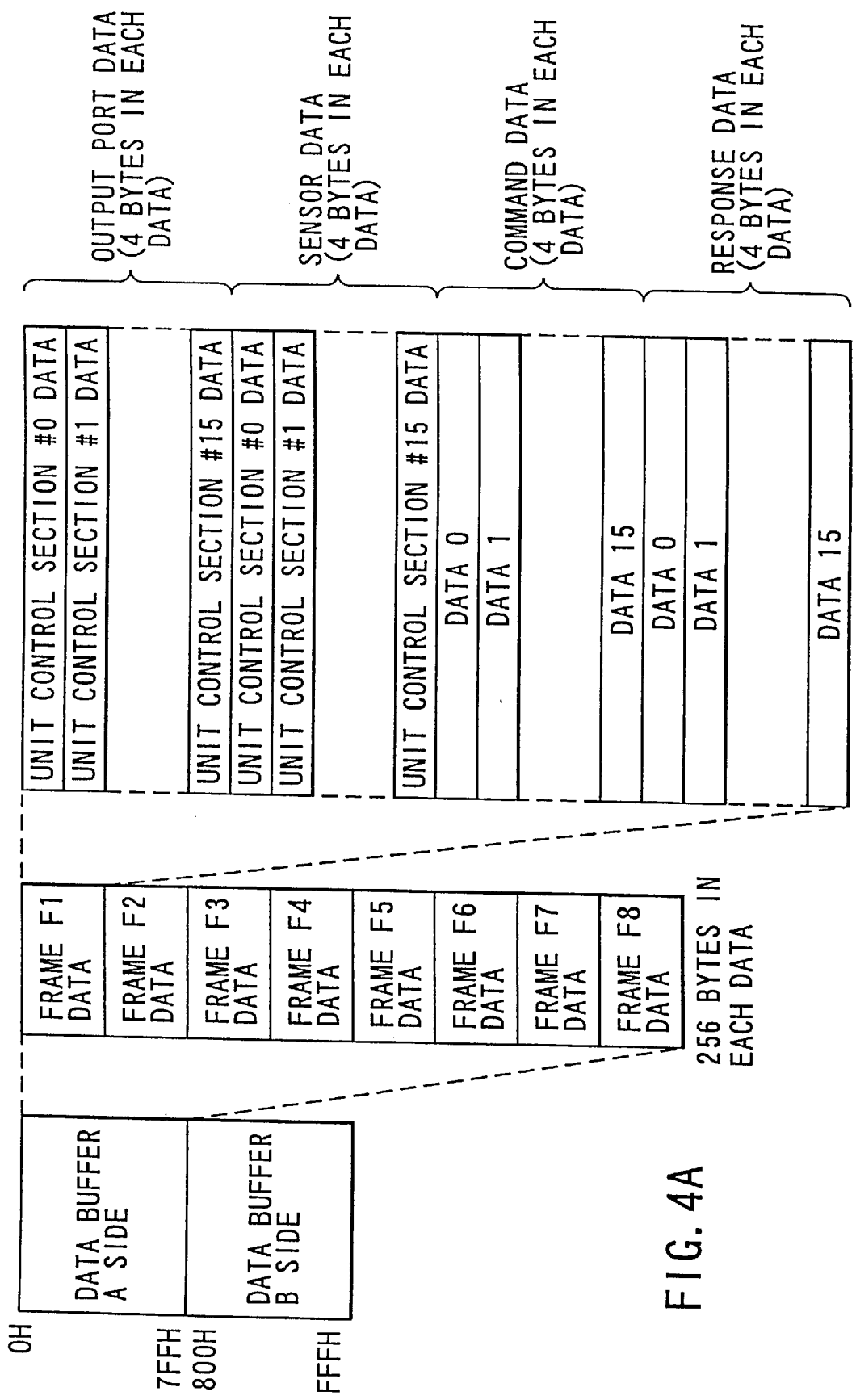
FIG. 4A is a diagram showing a recording format for a data buffer 108.

Next, FIG. 4A is a diagram showing a recording format for the data buffer 108.

As shown in FIG. 4A, the data buffer 108 is divided into two sides A, B, and the synchronization signal-receiving section 103 alternately switches these two sides for data writes. The CPU 109 reads data from a side of the data buffer different from the one to which the synchronization signal-receiving section 103 is writing data, thereby preventing invalid data from occurring before or after the write and read.

The sides A and B of the data buffer 108 each have a capacity corresponding to eight frames (frame data F1 to F8). The frame data F1 to F8 are each divided into output port data, sensor data, command data, and response data.

Furthermore, the data are recorded in the order of occurrence, but since data from 16 unit control sections #0 to 15 are sequentially transmitted, the output port data (see FIG. 4B) and the sensor data (see FIG. 4C) are recorded orderly.

On the other hand, since the command data (see FIG. 4D) and the response data (see FIG. 4E) are each sent to a desired one of the unit control sections 20 (#0 to #15) as appropriate, unit control section addresses are added to these data before recording.

References SI1 to SI8 in each data in FIGS. 4B to E designate portions in which values from the external-input section 101 are recorded. That is, the external-input section 101 records these signals in a time series over time interval shorter than for the other signals, as part of each of the 16 data on output port, sensor, command, or response.

Once the synchronization signal-receiving section 103 has completed writing 8 frames of data to the data buffer 108, it uses an interruption to request a data read from the data buffer 108.

Figure 5:
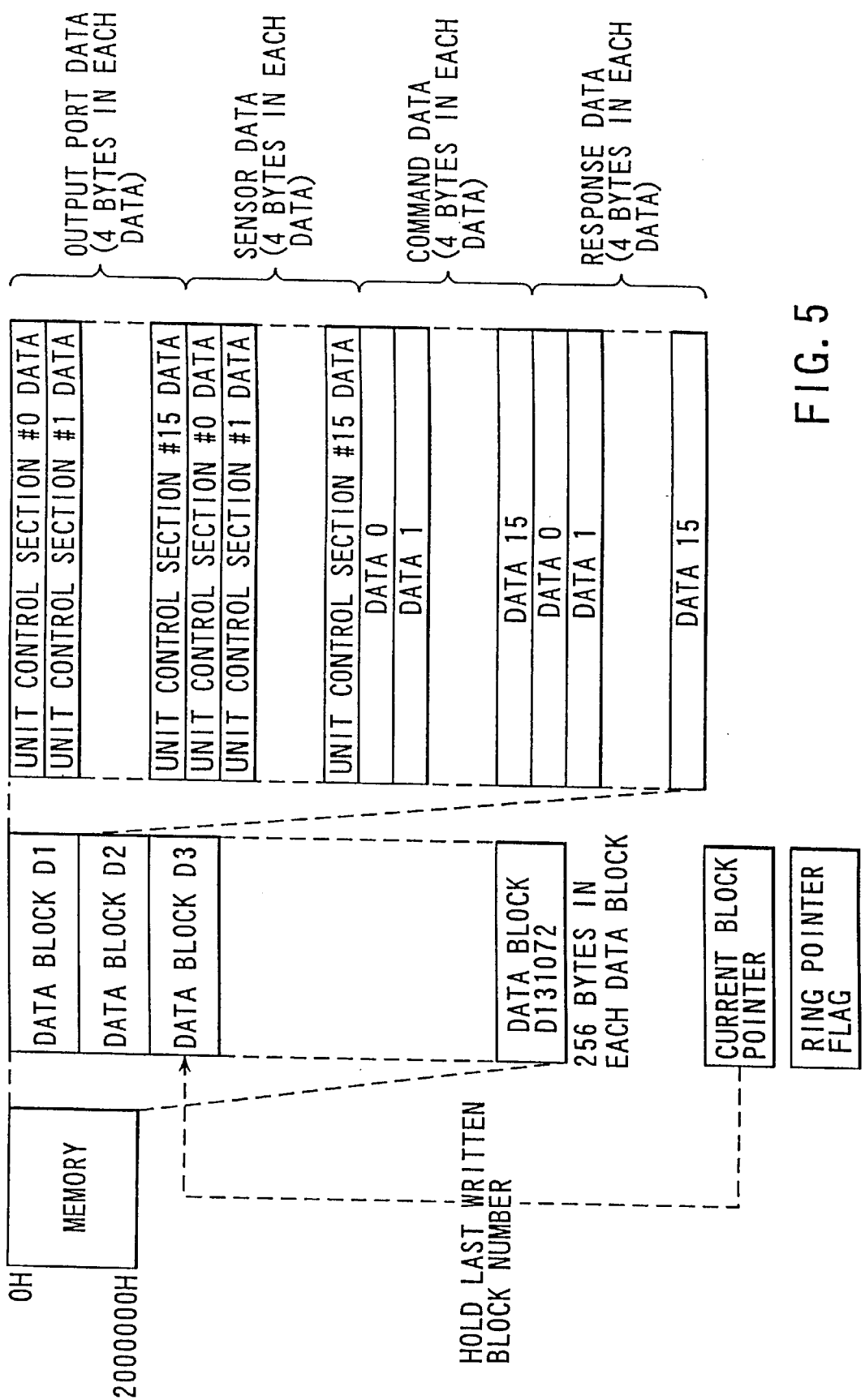
FIG. 5 is a diagram showing a recording format for a memory 110.

Next, FIG. 5 shows a recording format for the memory 100.

As shown in this figure, the format of data recorded in data blocks D1 to D131072 is identical to the format of the data recorded in the data buffer 108 in FIGS. 4A to 4E. The CPU 109 directly and sequentially writes data read out from the data buffer 108, to the data blocks D1 to D131072.

Further, in writing data to the data blocks D1 to D131072, the CPU 109 increments the current block pointer to maintain the last data block number in which data is recorded.

This example has 131,072 data blocks, but employs a ring buffer form in which if more than 131,072 data blocks are required due to an extended recording time, the write block number is returned to D1 to allow the previous data to be overwritten. In such a case, a ring buffer flag is set to 1 when overwriting the block D1 to indicate that the start block number is not 1 but the one next to the current block pointer value.

Figure 6:
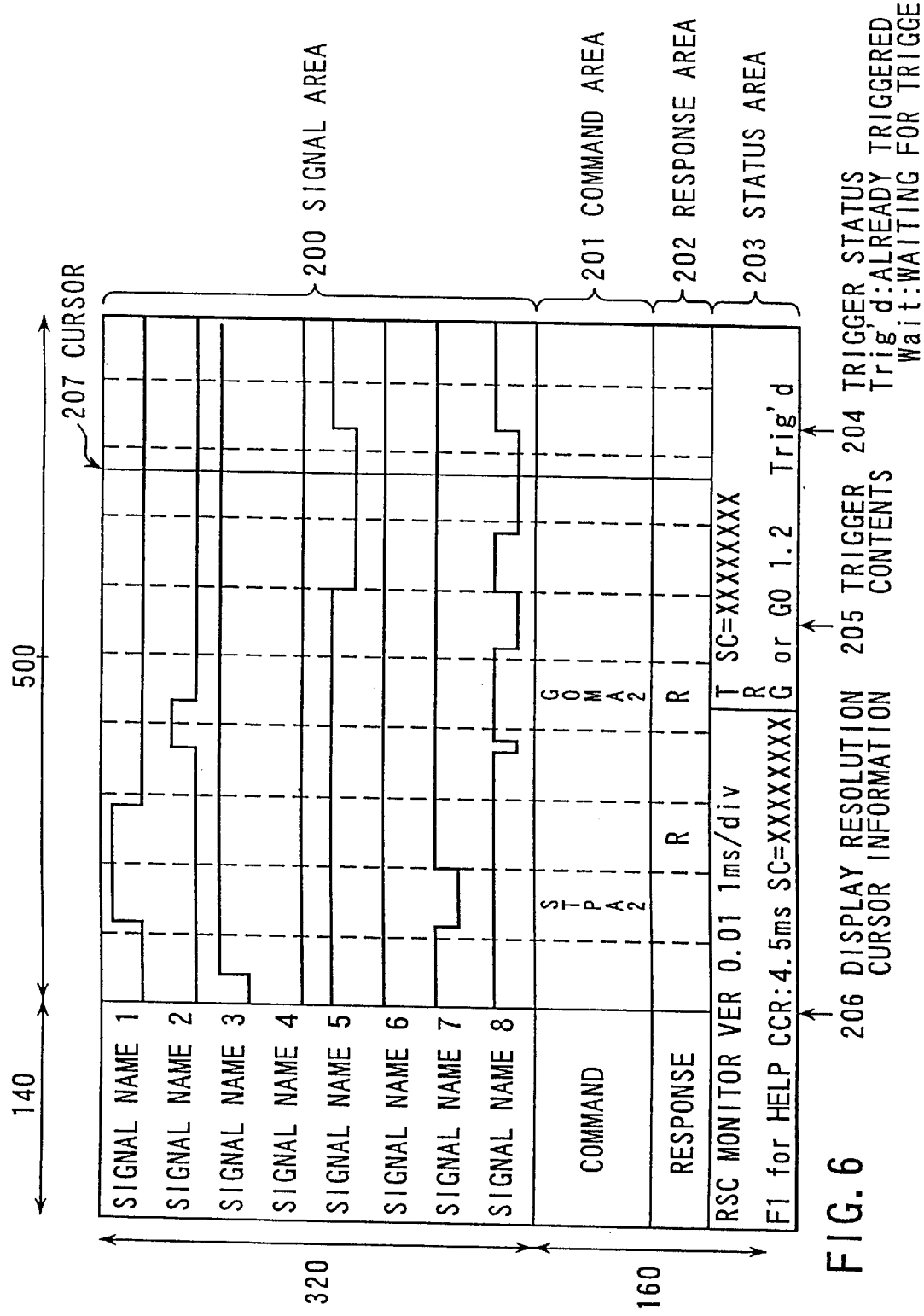
FIG. 6 is a diagram showing the display images.
Figure 8:
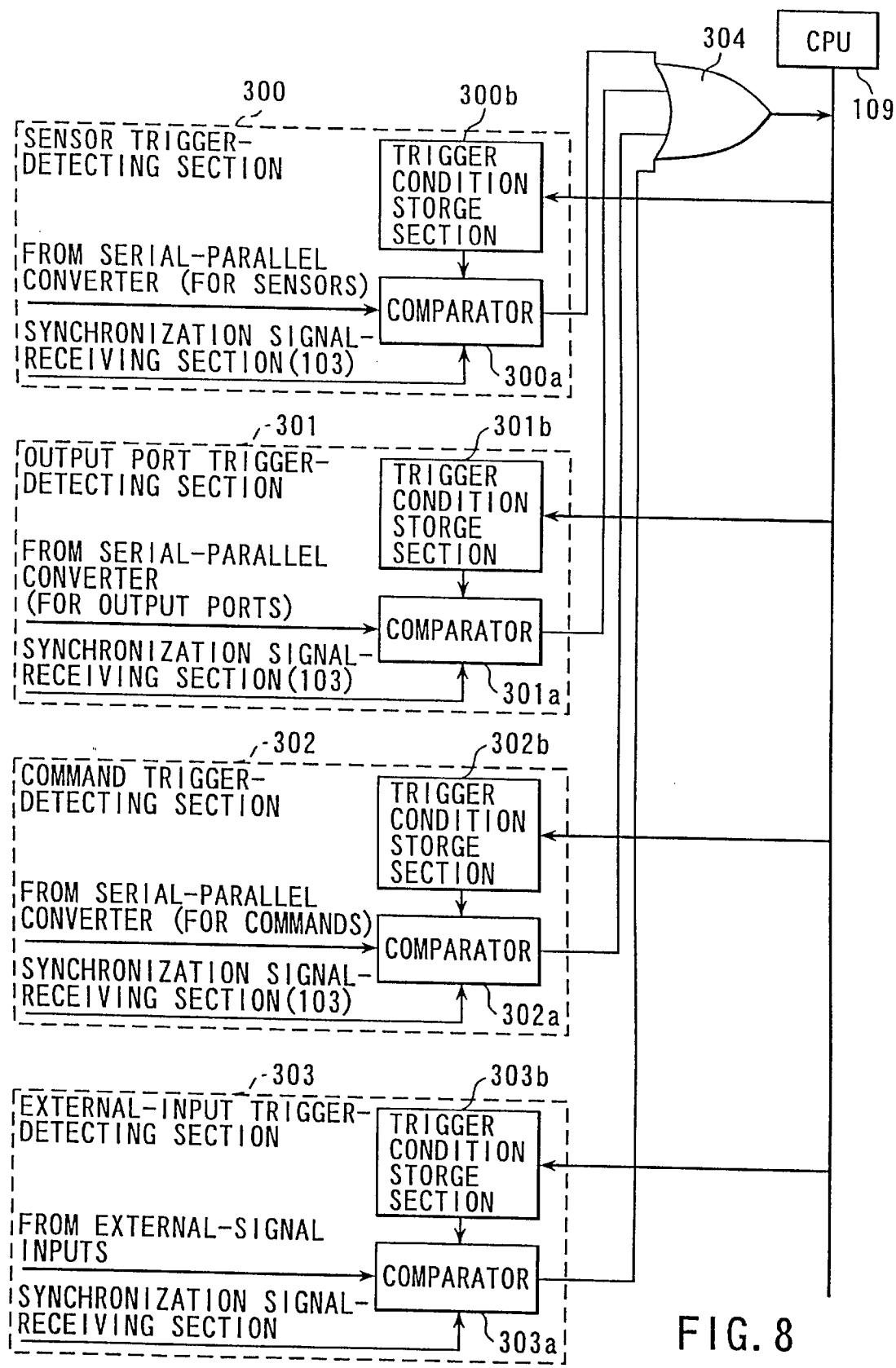
FIG. 8 is a diagram showing the detailed configuration of a trigger detection section 113.

Next, FIG. 6 is a diagram showing a display screen image.

As shown in this figure, the display screen is roughly divided into a signal area 200, a command area 201, a response area 202, and a status area 203. The data screen is updated at intervals of, for example, 5.12 (640 μs×8=5.12 msec) msec.

In the signal area 200, located at the top, states of the sensor, output port, and external-input section are displayed in graphs by indicating the time on the axis of abscissa and the ON/OFF state on the axis of ordinate.

The command area 201 displays commands sent out from the main control section 1 to the unit control section 20. In this area, abbreviated command names, unit control section numbers, and motor numbers are displayed in this order from top. Further, the response area 202 displays responses sent out from the unit control section 20 to the main control section 1. In this area, only the character "R" is displayed on the time axis.

In this manner, the sensor, the output port, the external-input section, the command, and the response are all displayed correspondently on the same time axis, whereby the temporal relationship between variations in sensor state and output port control and command issuance can be checked easily.

Besides, the status area displays a state of the monitor. That is, the status area 203 displays a display resolution 208 and cursor information 206, trigger contents 205, and a trigger status (Trig'd: already triggered; Wait: waiting for trigger) 204.

Since 256 sensors and 256 output ports can be mounted in the unit control section 20 and signals from the external-input section 101 are also displayed in the signal area 200, not all the signals can be simultaneously displayed. Thus, the monitor device for a control system according to this embodiment can select signals to be displayed.

In addition, FIG. 6 shows a cursor 207, which can be moved on the time axis to determine, at an arbitrary position, the state of a signal and the time interval from a trigger position. The cursor 207 is moved using, for example, an arrow key, and once the cursor 207 has reached an end of the display screen, the screen scrolls automatically.

FIG. 7 is a diagram showing a signal area display selection screen.

When either "sensor" or "port" or "external input" is selected in a "selection type" section, located at the top, a list of the selected type is displayed so that signals to be displayed can be selected. The "sensor", "port", and "external input" can be mixed together for the signals displayed in the signal area.

This configuration will be described in further detail. To add a sensor or the like by operating the same screen, a type to be added (sensor, port, or external input) is first determined. Then, a mouse pointer is moved onto a sensor in the list box which is to be added, and is then double-clicked to add this sensor. At this point, after this movement, a similar result can be obtained by depressing a [→] button. In this case, however, it must be assured that the sensor for addition in the left-hand box is reversely displayed, before depressing the button. The sensor added in this manner is displayed in the right-hand list box.

On the other hand, the currently selected sensor can be deleted simply by moving a desired sensor from right-hand list box to left-hand list box through an operation similar to the above addition.

FIG. 18 is a diagram showing the details of the trigger detecting section 113.

As shown in this figure, the trigger detecting section 113 consists of a sensor trigger-detecting section 300, an output port trigger-detecting section 301, a command trigger-detecting section 302, and an external-input trigger-detecting section 303. The trigger detecting sections 300 to 303 have trigger condition storage sections 300b, 301b, 302b, 303b and comparators 300a, 301a, 302a, 303a, respectively.

In this configuration, when data from the serial-parallel converter 104 to 107 (for external outputs, the external-signal input section 101) matches a pattern stored in the trigger condition storage section 300b, 301b, 302b, 303b, the corresponding detecting section 300 to 303 communicates the trigger condition to the CPU 109. On receiving the notification of the trigger condition, the CPU 109 starts or stops obtaining data depending on preset conditions.

A transfer state display function provided by the monitor device for a control system will be described below with reference to relevant drawings. The transfer states that can be displayed by this embodiment are skew, transfer time, passing time, pitch cap.

First, the skew display will be explained.

FIG. 9A shows the relationship between a skew in the medium and the sensor. FIG. 9B shows variations in sensor state observed when three media are transferred.

As shown in FIG. 9A, when the medium is transferred at a skew angle φ, signals from two contiguous sensors SC1, SC2 located on an axis perpendicular to the transfer direction in the figure get light and dark due to a time difference depending on the skew angle φ. When the interval between the sensors SC1 and SC2 is defined as A, the medium transfer speed is defined as V, the time difference is defined as T, and the skew angle is defined as φ, the following equation holds:

$$A \times \tan \phi = V \times T$$

Figure 10:
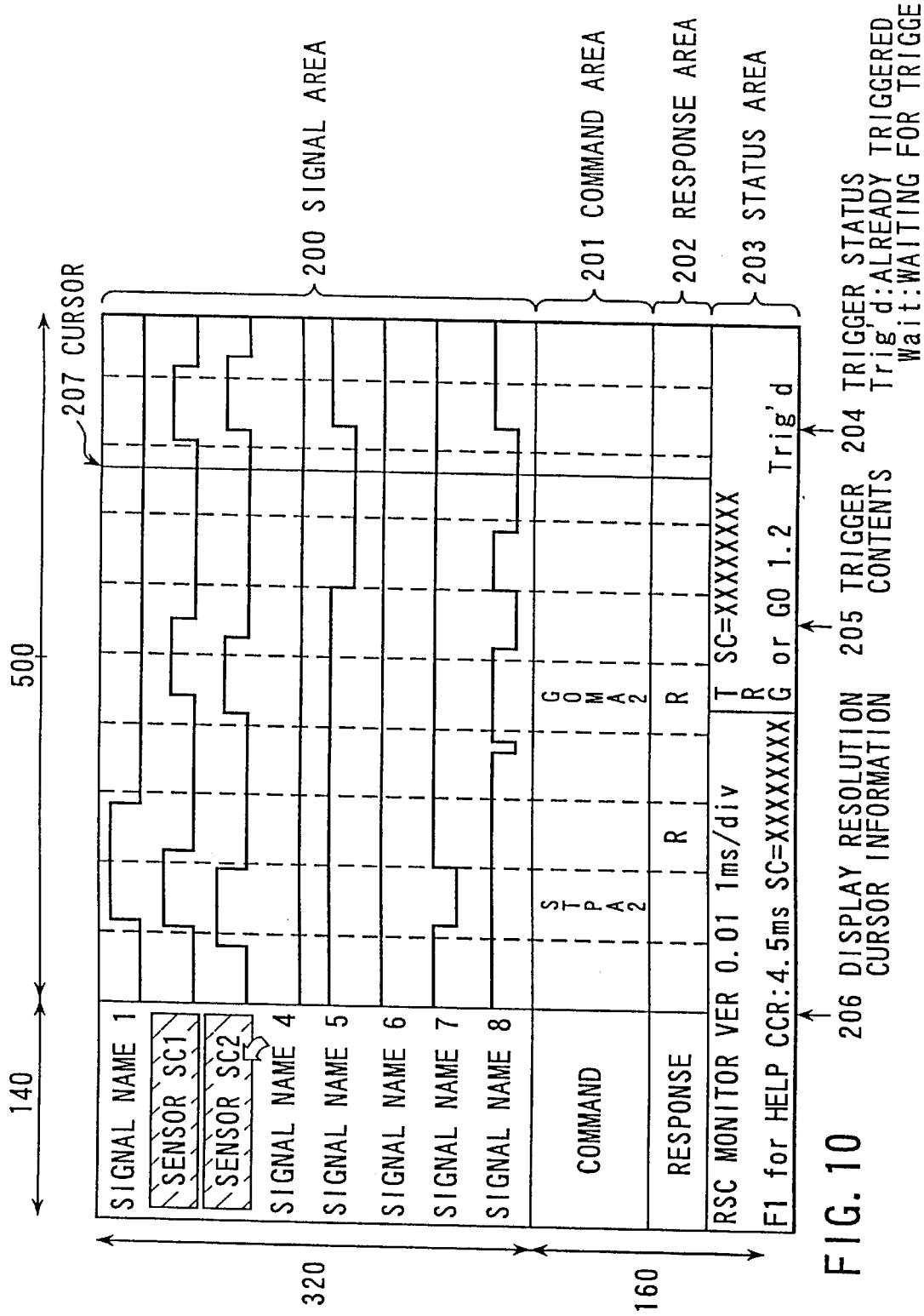
FIG. 10 is a diagram showing how a measured sensor is selected.

FIG. 10 is a diagram showing how a measuring sensor is selected.

Since the skew need not be measured for all the measurement range, this embodiment enables the range to be specified.

As shown in FIG. 11, when the cursor is placed on the screen at a position from which measurements are started and a [Space] key is then depressed, a mark cursor indicating a measurement start position is displayed at the cursor position. When the arrow key is operated rightward or leftward, the cursor moves while the mark cursor is being fixedly displayed. Then, when the cursor is placed at a position at which measurements are ended and a skew measuring operation is performed, measurements are conducted from the mark cursor to the cursor position.

FIG. 12A is a diagram showing a measurement setting screen. In this screen, the first selected sensor is displayed in the left of the screen, while the second selected sensor is displayed in the right thereof. To change these sensors, a [left/Right] button is depressed. An SC distance (mm) section displays a default distance between the sensors but this value can be changed by means of input.

When a [Display] button in the screen in FIG. 12A is depressed, a screen in the form of a sheet as shown in FIG. 12B is displayed. At this point, data corresponding to the number of detected skews are displayed in the sheet. The number of data displayed in this sheet, however, is limited to 1,000. Accordingly, if the number exceeds this value, an error occurs and the range specification must be reduced before performing the operation again.

Figure 12C:
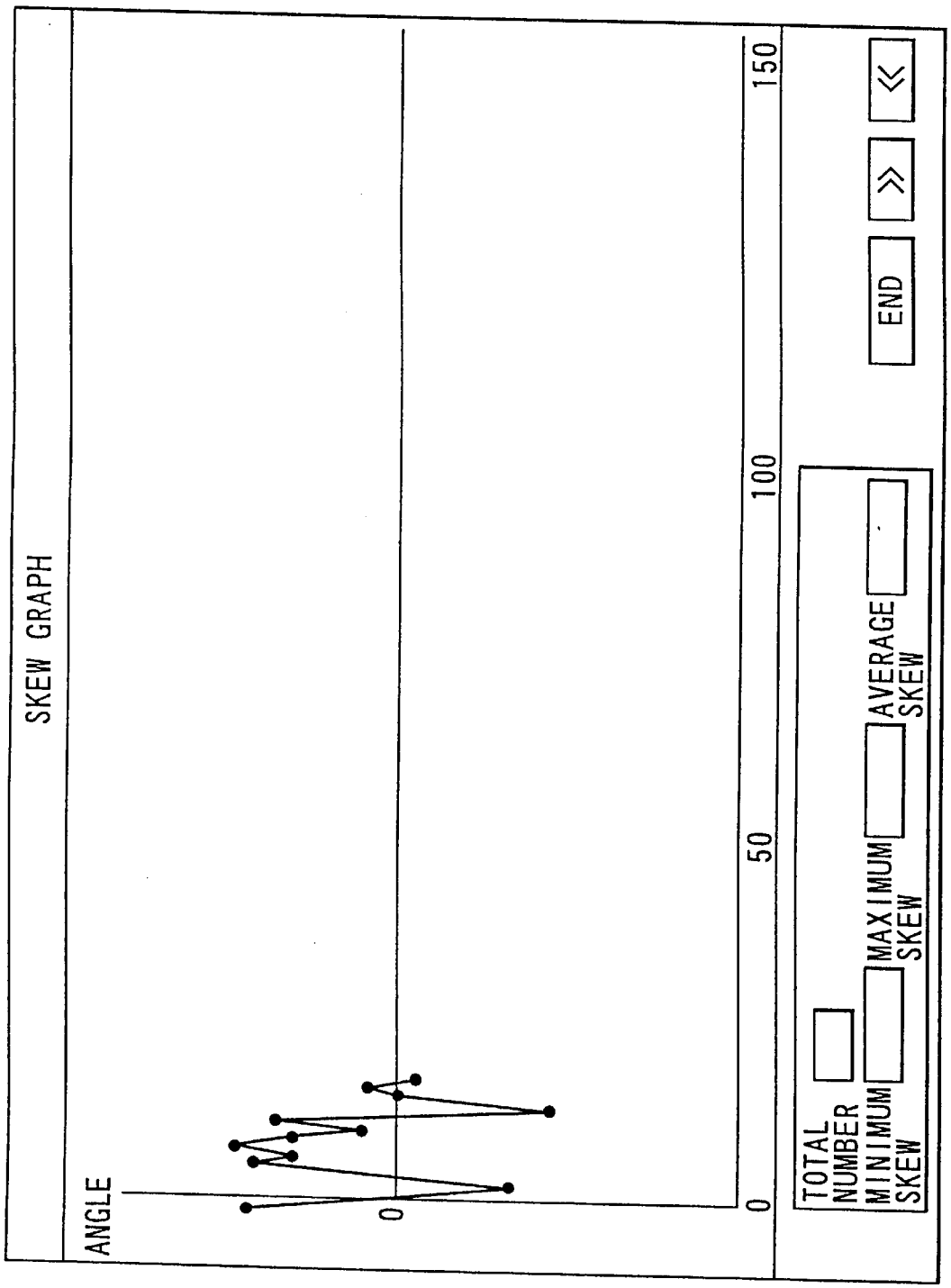
FIG. 12C is a diagram showing a skew graph.
Figure 13:
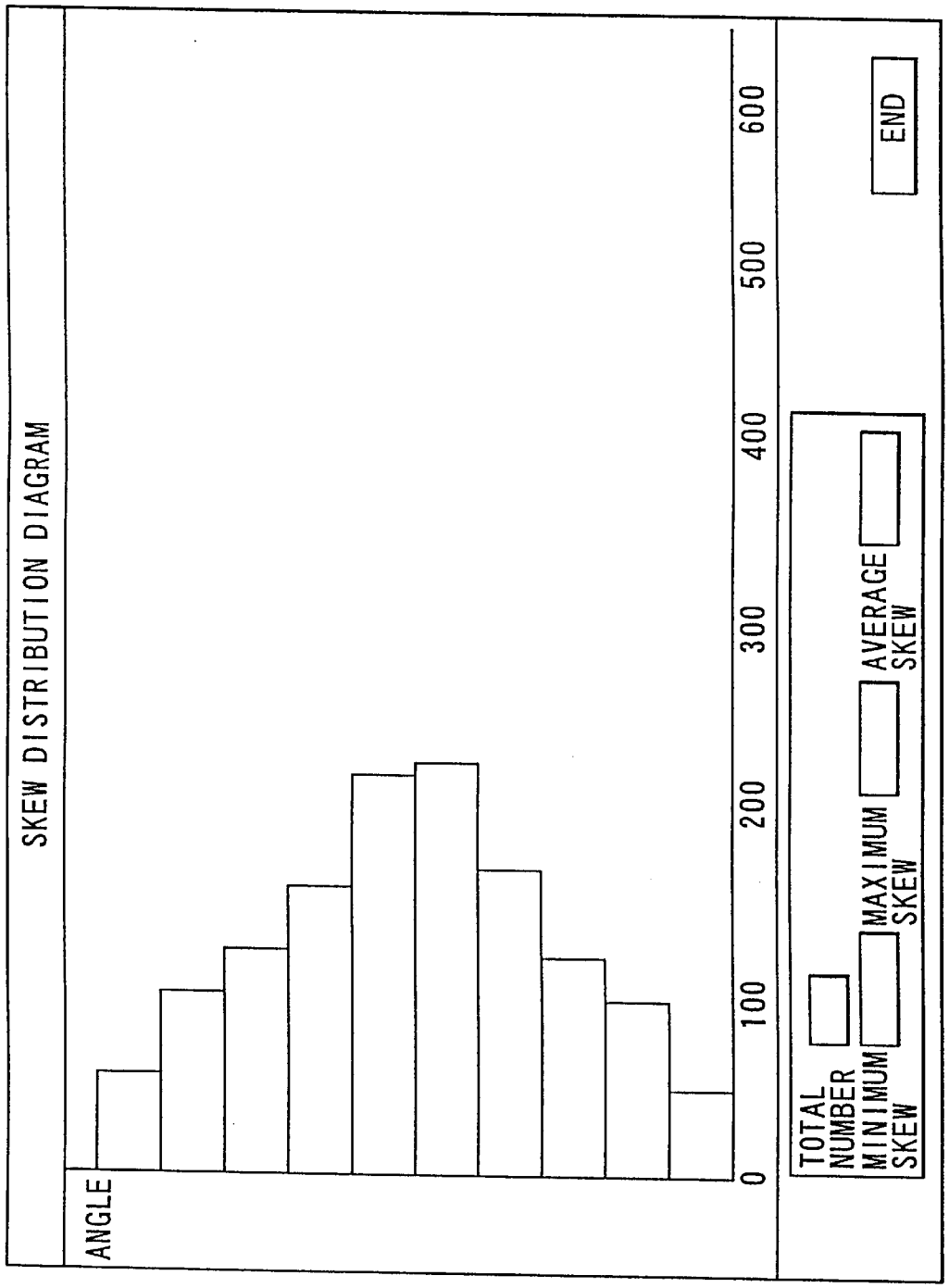
FIG. 13 is a skew distribution diagram.

When a [Distribution] button in the screen in FIG. 12B is depressed, a histogram screen (skew distribution diagram) is displayed indicating the number of processed media on the axis of abscissa and the angle on the axis of ordinate, as shown in FIG. 13. When a [Graph] button is depressed, a line graph screen (skew graph) indicating the number of processed media on the axis of abscissa and the angle on the axis of ordinate, as shown in FIG. 12C.

The skew graph sequentially displays the skew angles of individual media in the line graph, and the skew distribution diagram displays the frequencies of skew angles within the measurement range. When a [Save] button in FIG. 12B is depressed, the data displayed on the sheet can be saved in a file in the CSV form.

Figure 14:
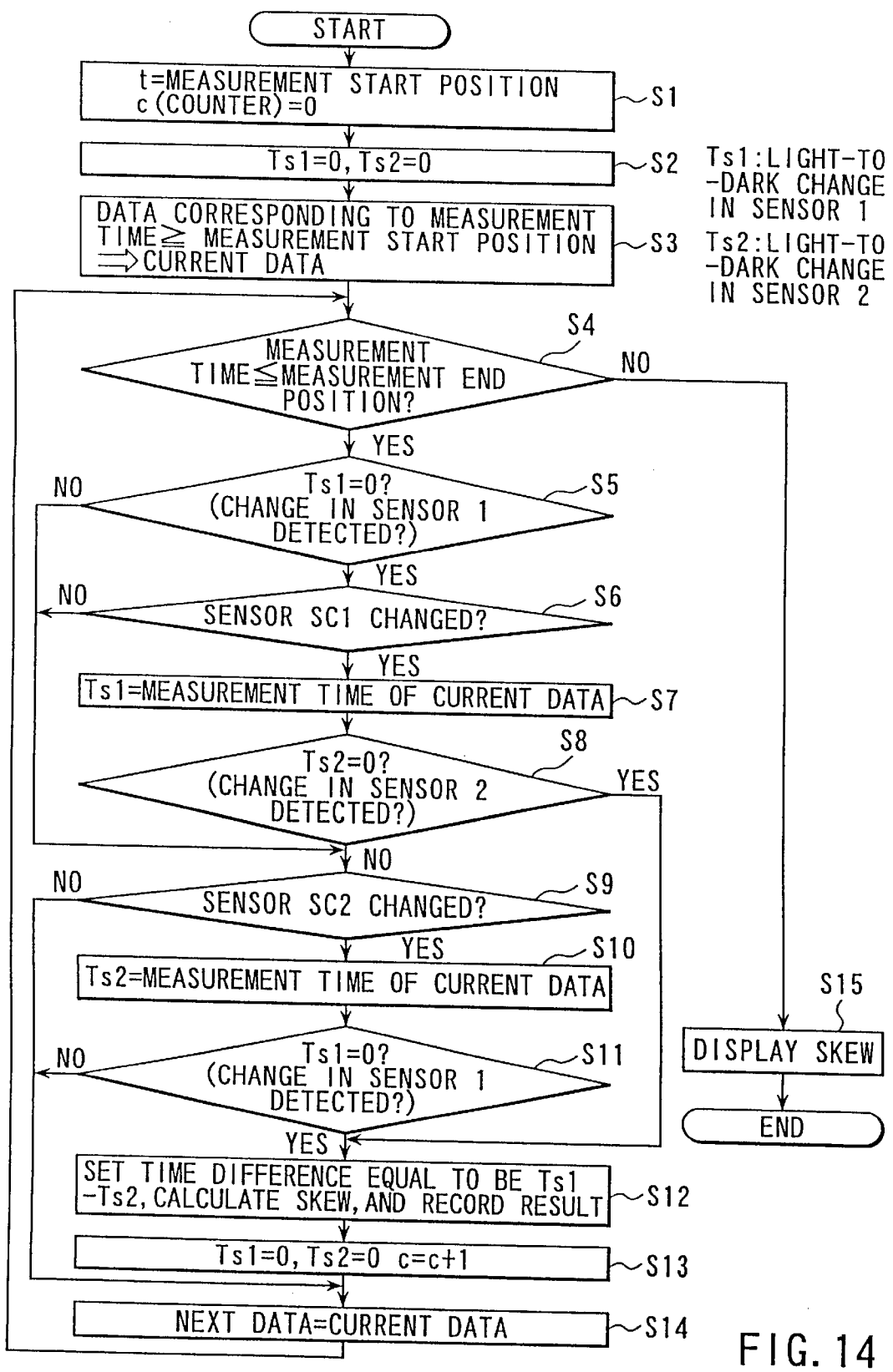
FIG. 14 is a flow chart useful in describing a skew calculation method sequence in detail.

A skew calculation method sequence will be described below in detail with reference to the flow chart in FIG. 14. Sensor ON/OFF information is recorded as part of frame data recorded based on the measurement time as shown in FIGS. 4 and 5.

The skew is calculated by detecting a position between the measurement start position and the measurement end position where one of the measuring sensors SC1 and SC2 changes from light to dark (arrival of the medium) and then detecting a position where the other sensor SC1 or SC2 changes from light to dark to determine the time difference between these positions.

That is, the measurement start position is stored in a variable t, and a counter c is cleared (a step S1). A variable Ts1 indicating a change in sensor SC1 from light to dark and a variable Ts2 indicating a change in sensor SC2 from light to dark are cleared (a step S2). Data indicating measurement time $\geq$ measurement start position is set as the current data (a step S3). It is determined whether measurement time $\leq$ measurement end position (a step S4). If measurement time $\leq$ measurement end position doe not hold, the skew is displayed (a step) to complete this operation.

On the other hand, if measurement time $\leq$ measurement end position, it is subsequently detected whether Ts1 equals 0, that is, whether a change in sensor SC1 has been detected (a step S5). If it has not been detected, it is detected whether or not the sensor SC1 has changed (a step S6). The measurement time of the current data is stored in Ts1 (a step S7). Subsequently, it is detected whether Ts2 equals 0, that is, whether a change in sensor SC2 has not been detected (a step S8). If it has not been detected, the process shifts to a step S12, and otherwise, the process proceeds to a step S9.

If it is determined at the step S5 that Ts1 does not equal 0, if it is determined at the step S6 that no change has occurred in sensor SC1, and if it is determined at the step S8 that Ts2 equal 0, then it is detected whether the sensor SC2 has been changed (the step S9). If the sensor SC2 has been changed, the measurement time of the current data is stored in Ts2 (a step S10) and it is determined whether a change in sensor SC1 has been detected (a step S11).

If the sensor SC2 has not been changed at the step S9 and if it is determined at the step S11 that Ts1 equal 0, the next data is set as the current data and the process shifts to the step S4 to repeat the above described operation (a step S14).

If Ts2 does not equals 0 at the step S8 and if Ts1 does not equals 0 at the step S11, the time difference is set equal to Ts1–Ts2 to calculate the skew and the result is recorded (a step S12). Ts1 equals 0 and Ts2 equals 0 are set, the counter c is incremented, and the process then shifts to the step S14.

Next, a transfer time display will be described.

Figure 15A:
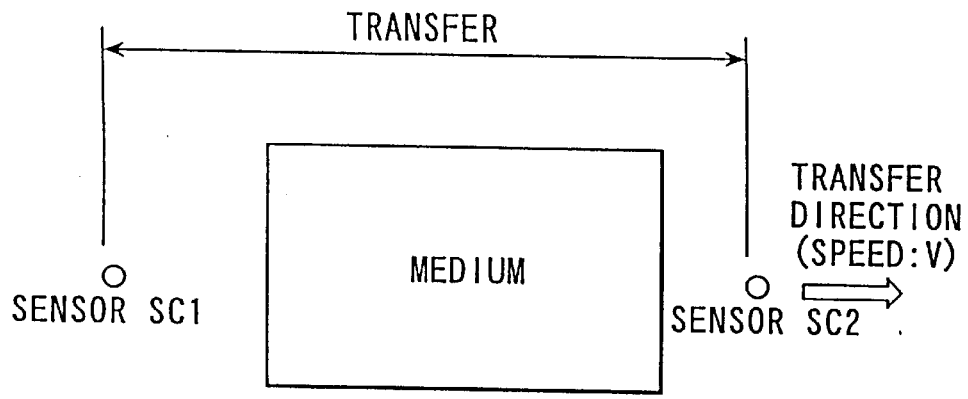
FIG. 15A is a diagram showing the relationship between a medium transfer direction and a sensor.
Figure 15B:
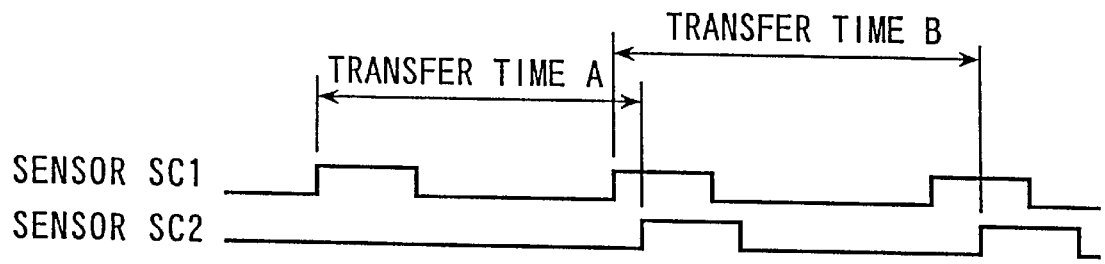
FIG. 15B is a diagram showing the relationship between transfer time and changes in sensor.

FIG. 15A shows the relationship between the medium transfer direction and the sensor location, and FIG. 15B shows the relationship between the transfer time and changes in sensor. As shown in these figures, when the medium passes by the sensors SC1 and SC2, the transfer time corresponds to the time from a light-to-dark change in sensor SC1 until a light-to-dark change in sensor SC2.

Figure 16A:
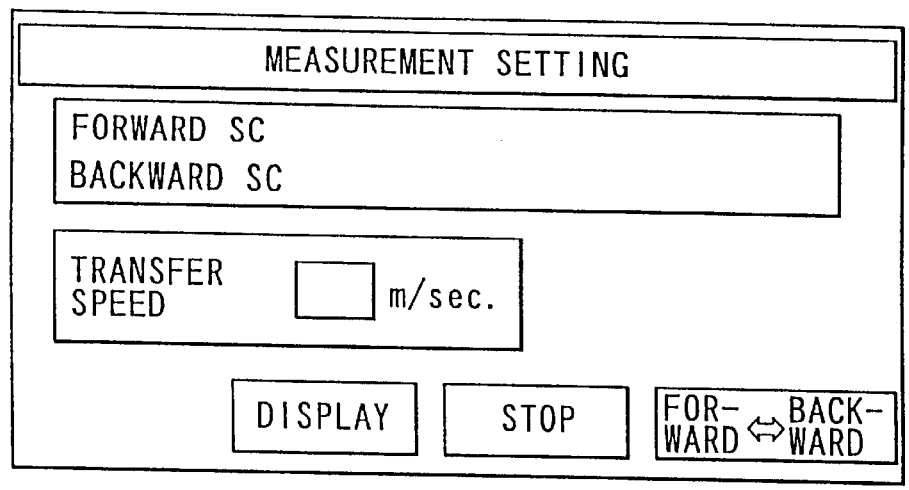
FIG. 16A is a diagram showing a measurement setting screen.
Figure 16B:
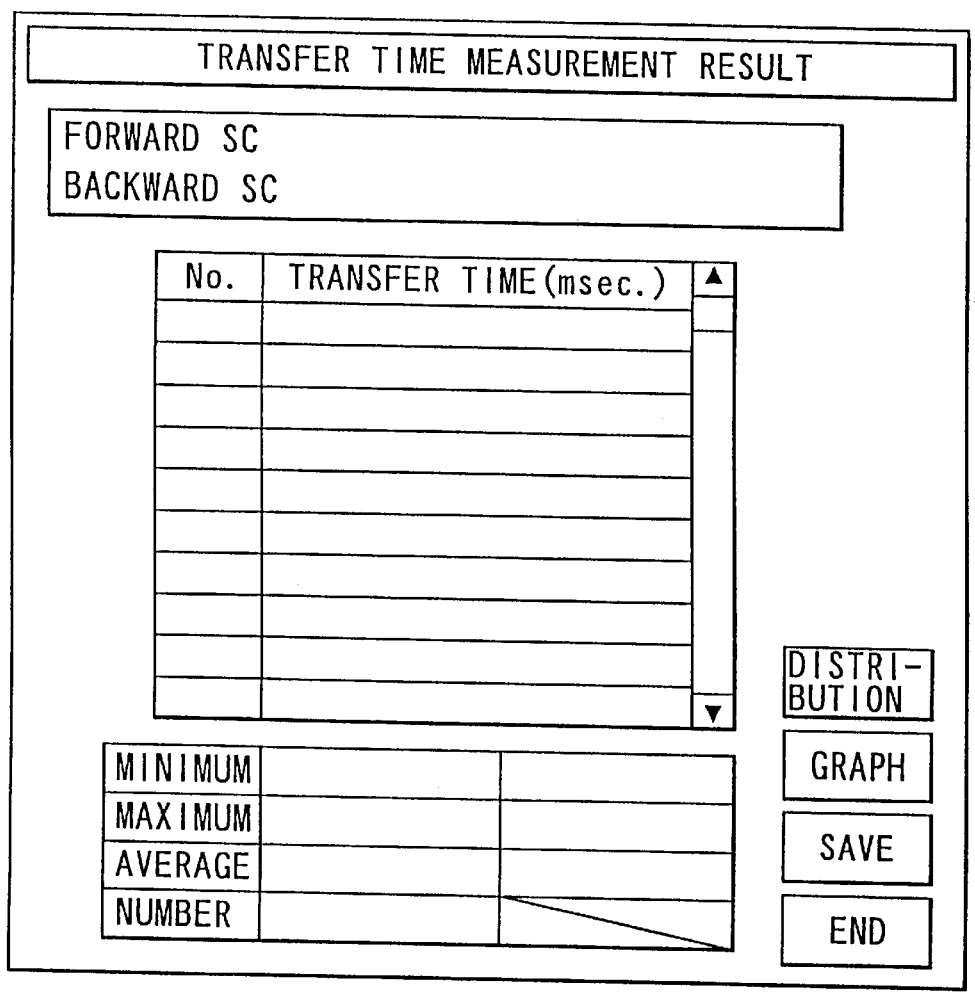
FIG. 16B is a diagram showing a transfer time measurement result screen.

FIG. 16A is a diagram showing a measurement setting screen. A transfer speed (m/sec) section displays a default value, which can be changed by an operator's input. When the [Display] button is depressed, a transfer time measurement result screen in the form of a sheet as shown in FIG. 16B is displayed. The number of data displayed in this sheet, however, is limited to 1,000. Accordingly, if the number exceeds this value, an error occurs and the range specification must be reduced before performing the operation again. The manner of detecting the dark state is similar to that for the skew.

In the screen shown in FIG. 16B, when the [Distribution] button is depressed, a histogram screen (not shown) is displayed indicating the number of processed media on the axis of abscissa and the angle on the axis of ordinate. When the [Graph] button is depressed, a line graph screen (not shown) indicating the number of processed media on the axis of abscissa and the angle on the axis of ordinate. Then, when the [Save] button is depressed, the data displayed on the sheet can be saved in a file in the CSV form. The above described histogram and graph screens are substantially the same as in the skew.

Figure 17:
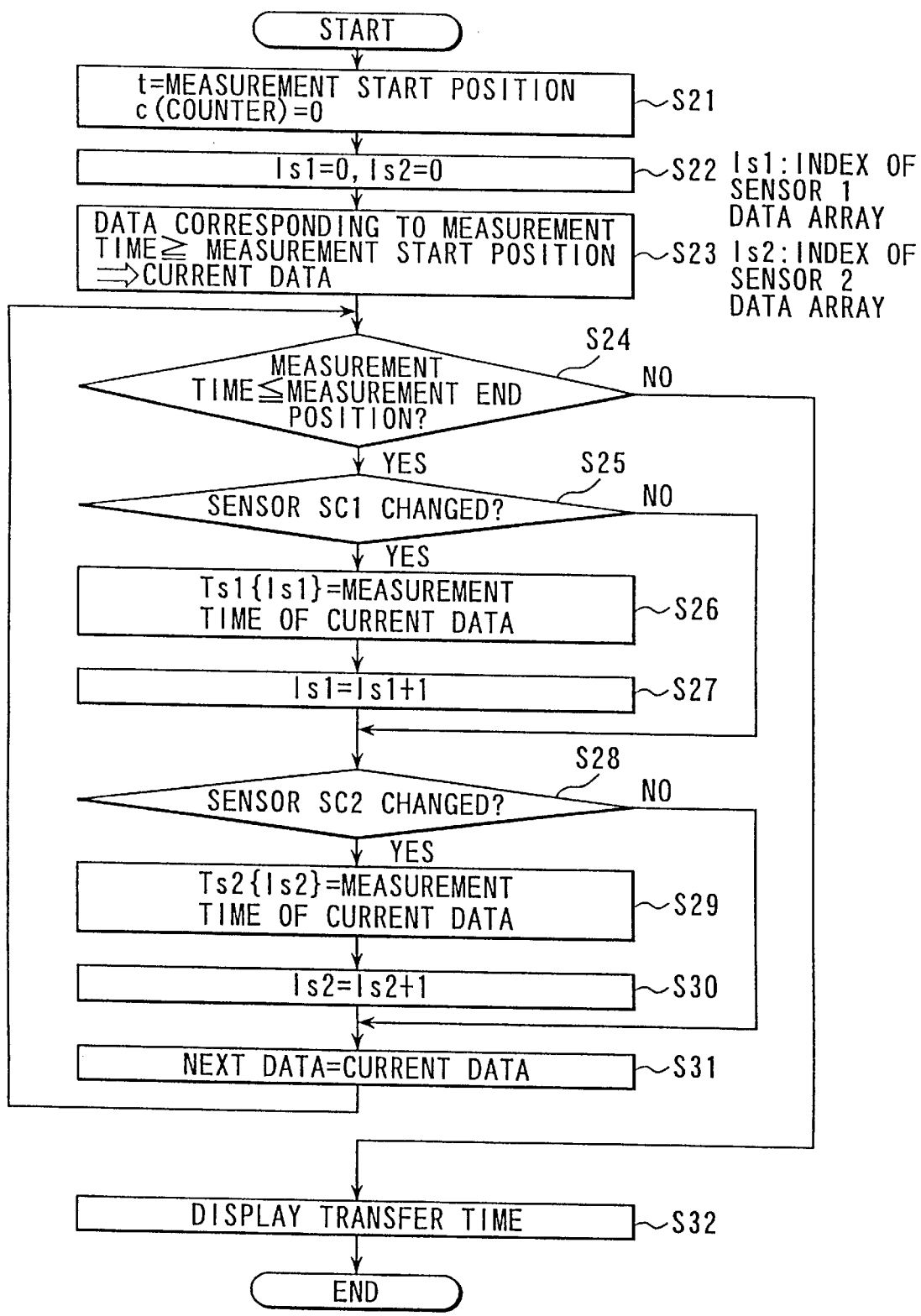
FIG. 17 is a flow chart useful in describing a transfer time calculation sequence carried out by a monitor device for a control system according to the embodiment.

A transfer time calculation sequence carried out by the monitor device for a control system according to this embodiment will be described below with reference to the flow chart in FIG. 17.

In this example, the transfer time is obtained by detecting a position between the measurement start position and the measurement end position where the measuring sensor SC1 changes from light to dark (arrival of the medium) and then detecting a position where the sensor SC2 changes from light to dark to determine the time difference between these positions.

That is, the measurement start position is stored in the variable t, and the counter c is cleared (a step S21). An index Is1 for a data array from the sensor SC1 is set at 0, and an index Is2 for a data array from the sensor SC2 is set at 0 (a step S22). Data indicating measurement time $\geq$ measurement start position is set as the current data (a step S23). It is determined whether measurement time $\leq$ measurement end position (a step S24).

If measurement time $\leq$ measurement end position, it is determined whether the sensor SC1 has been changed (a step S25). If it has been changed, the measurement time of the current data is stored in the Ts1[Is1] (a step S26), the Is1 is incremented, and the process proceeds to a step S28 (a step S27). On the other hand, if the sensor SC1 has not been changed at the step S25, the step S28 proceeds to step S28.

At the subsequent step S28, it is detected whether the sensor SC2 has been detected. Then, the measurement time of the current data is stored in the Ts2[Is2] (a step S29), the Is2 is incremented, and the process advances to a step S31 (a step S30).

On the contrary, if the sensor SC2 has not been changed at the step S28, the process advances to the subsequent step S31. Then, the next data is set as the current data, and the process passes to the step S24 (the step S31).

On the other hand, if measurement time $\leq$ measurement end position does not hold, the transfer time is displayed (a step S32) to complete the operation.

Next, a passing time display will be explained.

Figure 18A:
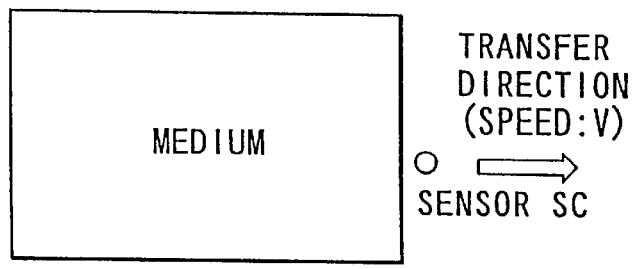
FIG. 18A is a diagram showing a medium, its transfer direction, and a location of a sensor SC.
Figure 18B:
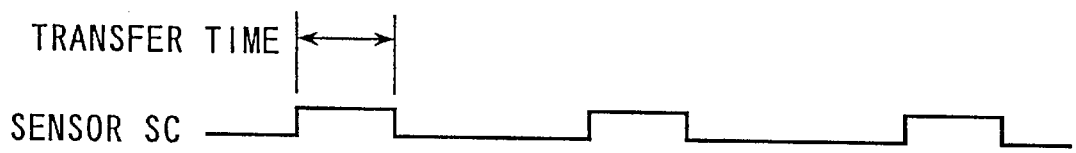
FIG. 18B is a diagram showing changes in sensor plotted as a function of medium passing time.

FIG. 18A is a diagram showing the medium, the transfer direction, and the location of the sensor SC. FIG. 18B is a diagram showing changes in sensor plotted against the medium passing time.

As shown in these figures, the passing time corresponds to the time from the arrival of a tip of the medium until a rear end thereof has passed the sensor SC.

Figure 19:
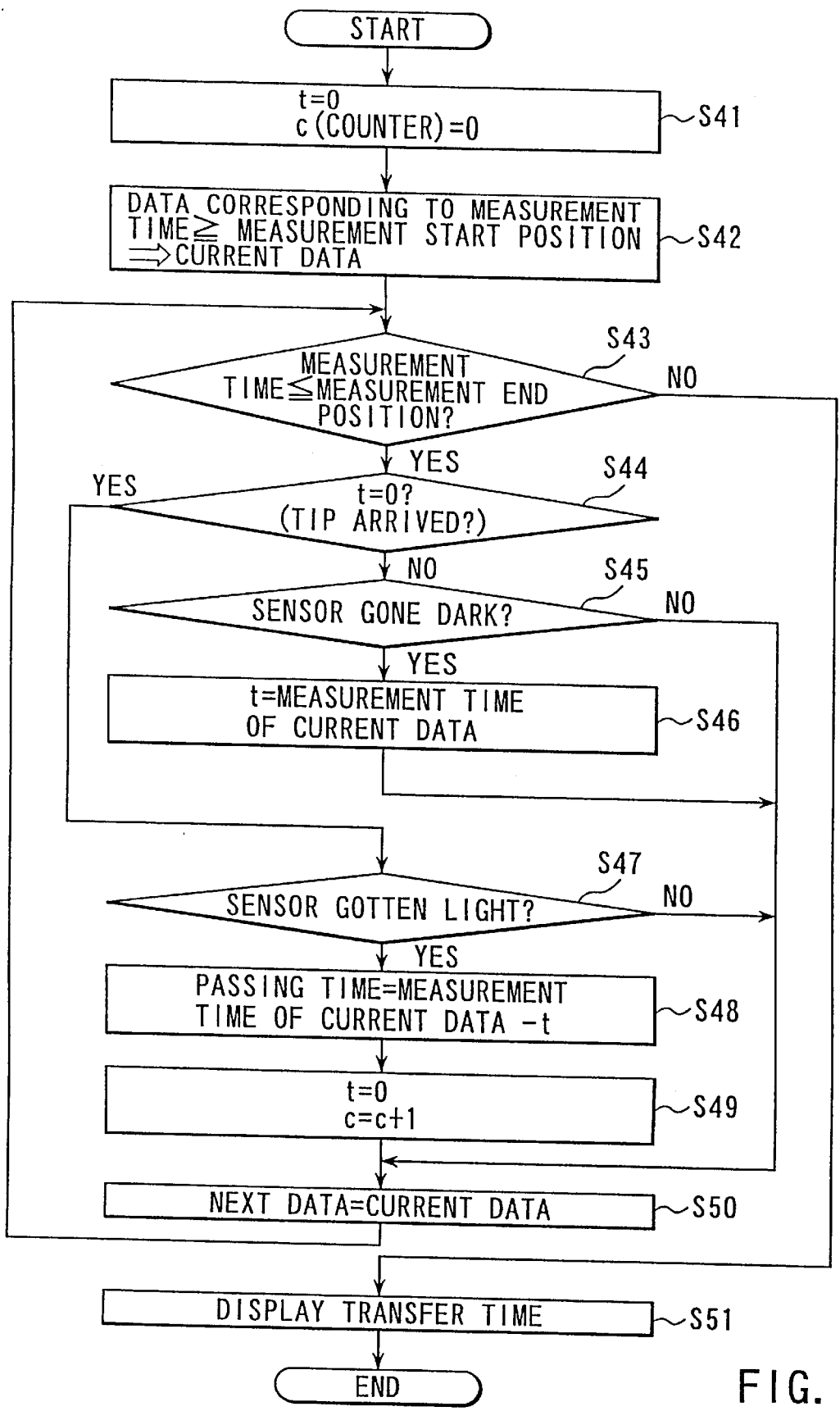
FIG. 19 is a flow chart useful in describing a passing time calculation sequence carried out by the monitor device for a control system according to the embodiment.

A passing time calculation sequence carried out by the monitor device for a control system according to this embodiment will be described below with reference to the flow chart in FIG. 19.

In this example, the passing time is obtained by detecting a position between the measurement start position and the measurement end position where the measuring sensor SC changes from light to dark (arrival of the medium) and then detecting a position where the sensor SC changes from dark to light to determine the time difference between these positions.

That is, the variable t and the counter c are set at 0 (a step S41). Data indicating measurement time≧measurement start position is set as the current data (a step S42). It is determined whether measurement time≦measurement end position (a step S43).

If measurement time≦measurement end position, it is determined whether t equals 0, that is, whether the tip has reached (a step S44). If the t does not equal 0, it is determined whether the sensor has gone dark (a step S45). If is has gone dark, the measurement time of the current data is stored in the t (a step S46).

On the other hand, if the t equals 0, it is determined whether the sensor has gotten light (a step S47). If it has gotten light, the passing time is set equal to the measurement time of the current data−t (a step S48), t is set equal to 0, and the counter c is incremented (a step S49).

If the step S45 branches to "N" and if after the step S46, the step S47 branches to "N", then the next data is set as the current data and the process returns to the step S43 (a step S50).

If measurement time≦measurement end position does not hold at the step S43, the transfer time is displayed (a step S51) to complete the operation.

Next, a pitch and gap display will be explained.

Figure 20A:
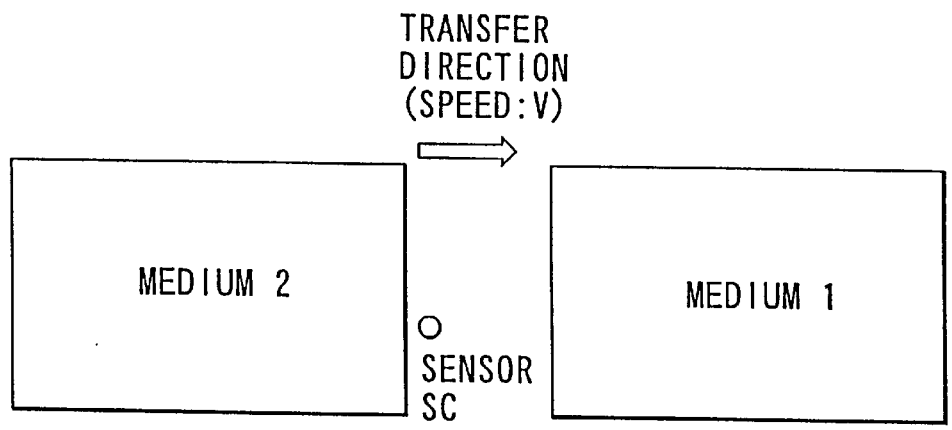
FIG. 20A is a diagram showing the locational relationship between media A, B and the sensor SC as well as the transfer direction.
Figure 20B:
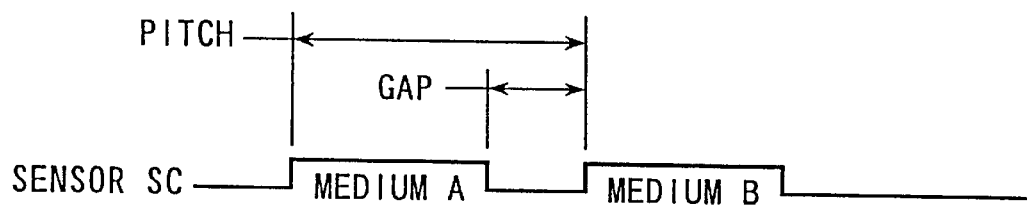
FIG. 20B is a diagram showing the relationship between a pitch and gap and changes in sensor.

FIG. 20A a diagram showing shows the locational relationship between media A, B and the sensor SC as well as the transfer direction. FIG. 20B is a diagram showing the relationship between a pitch and gap and changes in sensor.

In these figures, when a plurality of media are transferred, the distance between the tips of the media is called a "pitch", and the gap between the media is called a "gap".

Figure 21:
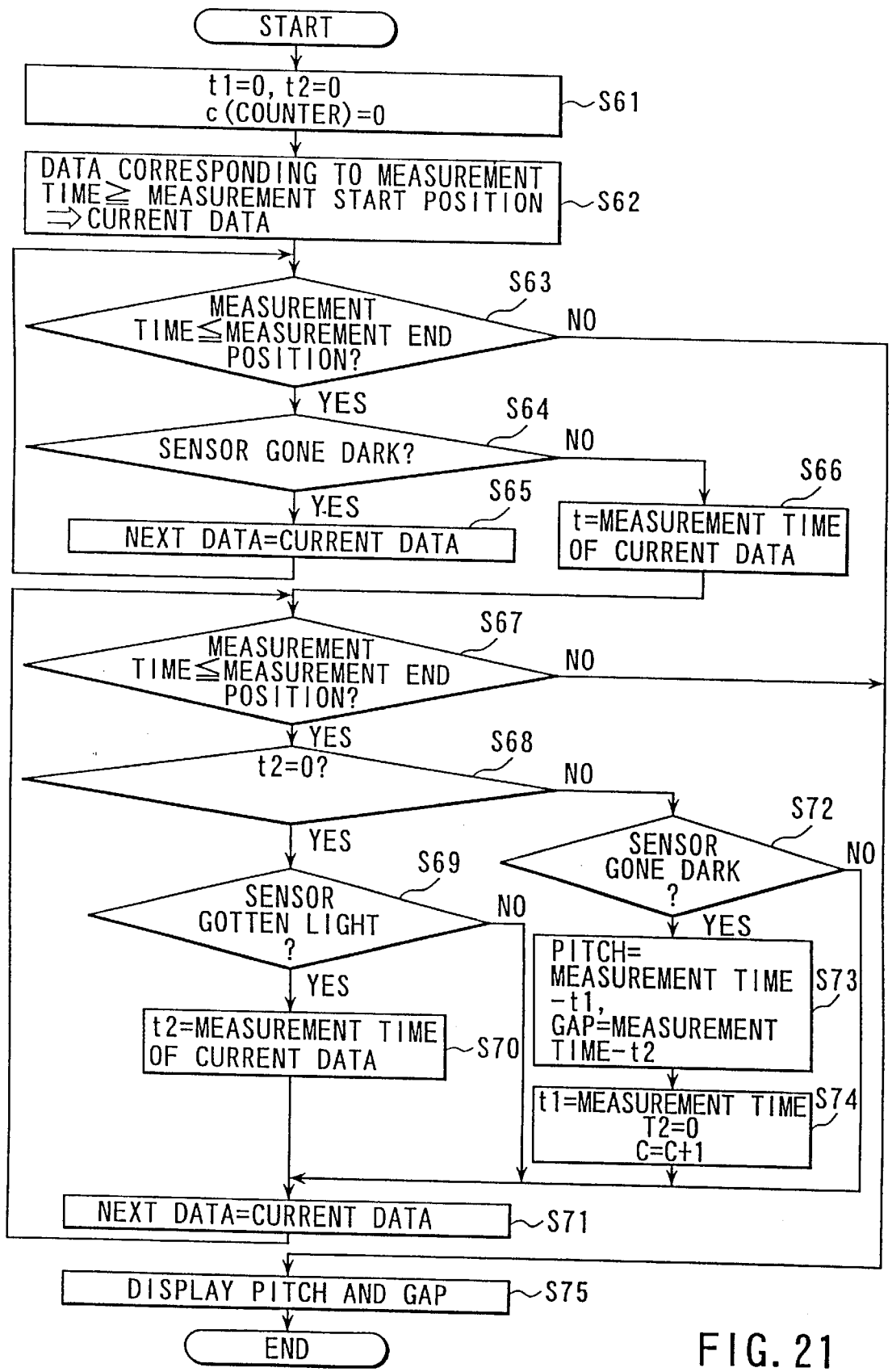
FIG. 21 is a flow chart useful in describing a pitch and gap calculation sequence carried out by the monitor device for a control system according to the embodiment.

A pitch and gap calculation sequence carried out by the monitor device for a control system according to this embodiment will be described below with reference to the flow chart in FIG. 21.

In this sequence, the pitch and gap are obtained by detecting a position between the measurement start position and the measurement end position where the measuring sensor SC changes from light to dark (arrival of the medium A) and then a position where the sensor changes from dark to light (the media A has passed through) and then detecting a position where the sensor SC changes from light to dark (arrival of the media B to determine the time difference between these positions.

That is, variables t1 and t2 are set at 0 and the counter c is also set at 0 (a step S61). Data indicating measurement time≧measurement start position is set as the current data (a step S62). It is determined whether measurement time≦measurement end position (a step S63).

If measurement time≦measurement end position, it is determined whether the sensor SC has gone dark (a step S64). If it has gone dark, the next data is set as the current data, and the process returns to the step S63 (a step S65). On the contrary, if measurement time≦measurement end position does not hold, the t1 is set equal to the measurement time of the current data, and the process shifts to the subsequent step S67 (a step S66).

Subsequently, it is determined again whether measurement time≦measurement end position (the step S67). If measurement time≦measurement end position, it is determined whether the t2 equals 0, that is, whether the rear end has not passed yet (step S68).

If it has not passed yet, it is determined whether the sensor SC has gotten light (a step S69). If it has gotten light, the t2 is set equal to the measurement time of the current data (a step S70), and the process shifts to a step S71.

If it is determined at the step S68 that the rear end has not passed yet, it is determined whether the sensor SC has gone dark (a step S72). If it has gone dark, the pitch is calculated to be measurement time−t1 and the gap is calculated to be the measurement time−t2 (a step S73). The t1 is set equal to measurement time and the t2 is set equal to 0, the counter c is incremented, and the process shifts to the step S71 (a step S74).

At the step S71, the next data is set as the current data, and the process returns to the step S67. If it is determined at the steps S63, S67 whether measurement time≦measurement end position does not hold, the pitch and gap are displayed (a step S75) to complete all the operations.

Next, a command retrieval function will be explained.

Figure 22:
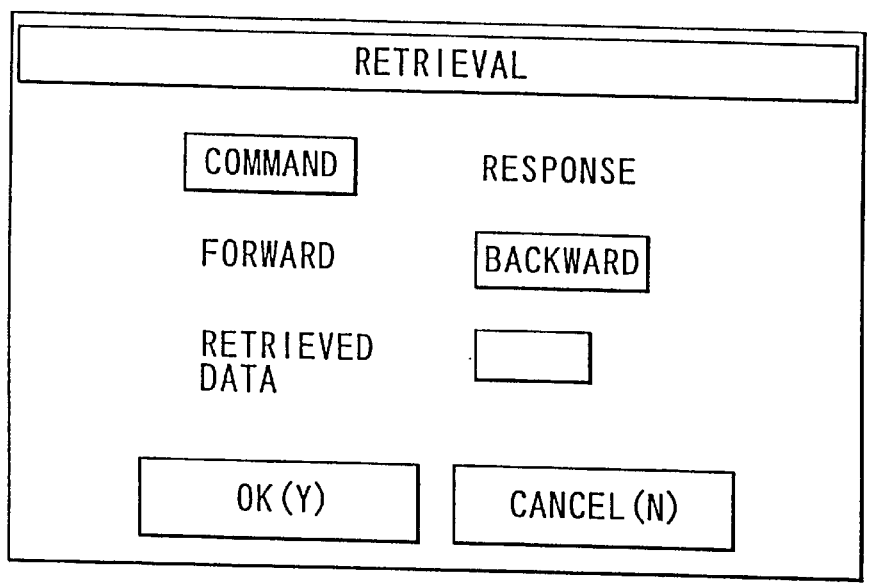
FIG. 22 is a diagram showing a command retrieval specification screen.

FIG. 22 is a diagram showing a command retrieval specification screen.

In this figure, when an abbreviated name of a command to be retrieved is entered in a "Retrieved Data" section and an [OK] button is specified, retrieval of an occurrence position of the command corresponding to the retrieved data is started from the cursor position. When the command is discovered, a range including the occurrence position is displayed on the display screen.

Figure 23:
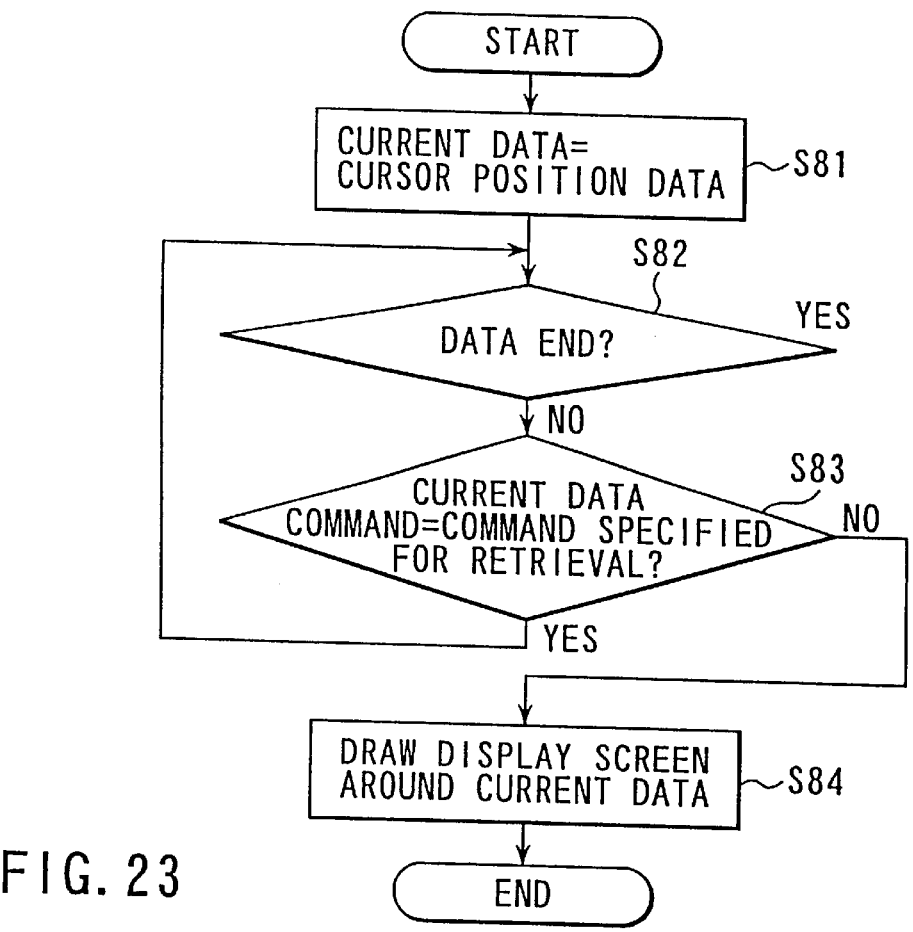
FIG. 23 is a flow chart useful in describing a command retrieval sequence carried out by the monitor device for a control system according to the embodiment.

A command retrieval sequence carried out by the monitor device for a control system according to this embodiment will be described with reference to the flow chart in FIG. 23.

The current data is set as the current position data (a step S81), and it is determined whether the command corresponding to the current data equals the command specified for retrieval, until the data is ended (a step S83). If the data is ended or the command corresponding to the current data does not equal the command specified for retrieval, a display screen is drawn around the current data (a step S84) to complete the operation.

The embodiment of the present invention has been described. The present invention provides the following effects: By obtaining serially multiplexed signals between a main controller and a unit, a large number of sensors and ports can be observed with a single connector connection, saving time and labor required to connect a large number of probes. Connections are also easy even if the sensor or substrate is mounted where it is not externally seen. Further, by displaying commands and responses not only for the sensors and ports but also for motor operations or the like, on the same time axis in parallel, the relationship between changes in state and control operations can be checked easily. Further, debugging and checking can be easily achieved by using the trigger function for stopping obtention of data when a particular command occurs and the function for retrieving a specified command in displaying obtained data. By obtaining not only signals on serial lines but also independent external signals to display these signals on the same time axis in parallel, terminal signals provided as results of control (for example, drive pulses for a stepping motor) or signals for a system controlled using a separate system can be displayed in conjunction with signals on the serial lines, thereby enabling easy comprehensive system debugging and operational checking. Further, by simply specifying sensors and a measurement range on the display screen, the transfer conditions such as the inclination of the medium, the transfer time, and the interval can be calculated and displayed.

As described above in detail, the present invention can provide a monitor device for a control system which monitors signals on the serial lines to obtain and display sensor information and actuator control information in order to allow the operational conditions of the control system to be observed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:
   input means for receiving inputs of serial signals transmitted from said controlled section via said serial lines and converting them into parallel signals;
   storage means for receiving inputs of predetermined signals transmitted from said controlled section via said serial lines and storing said parallel signals therein;
   display means for providing predetermined displays based on the signals stored in the storage means; and
   control means for providing control such that plural types of signals included in said serial signals are separately extracted based on predetermined synchronization signals and stored in corresponding predetermined areas of said storage means.

2. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:
   input means for receiving inputs of serial signals transmitted from said controlled section via said serial lines and converting them into parallel signals;
   storage means for receiving inputs of predetermined signals transmitted from said controlled section via said serial lines and storing said parallel signals therein;
   display means for providing predetermined displays based on the signals stored in the storage means; and
   control means for providing control such that signals included in said serial signals and concerning the output port of said controlled section and the sensor connected to said controlled section are separately extracted based on predetermined synchronization signals and stored in corresponding predetermined areas of said storage means.

3. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:
   input means for receiving inputs of serial signals transmitted from said controlled section via said serial lines and converting them into parallel signals;
   storage means for receiving inputs of predetermined signals transmitted from said controlled section via said serial lines and storing said parallel signals therein;
   display means for providing predetermined displays based on the signals stored in the storage means; and
   control means for providing control such that signals included in said serial signals and concerning commands transmitted from said control section for controlling the controlled section and responses transmitted from the controlled section to the control section are separately extracted based on predetermined synchronization signals and stored in corresponding predetermined areas of said storage means after predetermined address information have been added to these signals.

4. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:
   input means for receiving inputs of serial signals transmitted from said control and controlled sections via said serial lines and converting them into parallel signals;
   storage means for receiving inputs of predetermined signals transmitted from said control and controlled sections via said serial lines and storing said parallel signals therein; and
   display means for providing predetermined displays based on the signals stored in said storage means, wherein:
     the signals transmitted from said control and controlled sections via said serial lines include signals concerning an output port ON/OFF state of said controlled section and an ON/OFF state of a sensor connected to said controlled section, and wherein:
       said display means displays the sensor ON/OFF state and the output port ON/OFF state on the same time axis.

5. A monitor device for a control system according to claim 4, further comprising:
   external-signal input means for obtaining external signals via lines different from said serial lines, wherein:
     the signals transmitted from said control and controlled sections via said serial lines include signals concerning the output port ON/OFF state of said controlled section and the ON/OFF state of the sensor connected to said controlled section, and wherein:
       said display means displays the sensor ON/OFF state and the output port ON/OFF state on the same time axis and also displays information based on the external signals input via said external-signal input means.

6. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:

transmission means for transmitting from said control section commands for controlling said controlled section and transmitting responses from the controlled section to the control section;

input means for receiving inputs of serial signals transmitted from said control and controlled sections via said serial lines and of the command and response signals transmitted by said transmission means via said serial lines and converting these signals into parallel signals;

storage means for receiving inputs of predetermined signals transmitted from said control and controlled sections via said serial lines and storing said parallel signals therein; and display means for providing predetermined displays based on the signals stored in said storage means, wherein:

signals transmitted from said control and controlled sections via said serial lines include signals concerning an output port ON/OFF state of said controlled section and an ON/OFF state of a sensor connected to said controlled section, and wherein:

said display means displays information on the commands and responses input via said transmission means on the same time axis as for the sensor ON/OFF state and the output port ON/OFF state.

7. A monitor device for a control system according to claim 6, further comprising:

external-signal input means for obtaining external signals, wherein:

said display means displays information on the commands and responses input on the same time axis as for the sensor ON/OFF state, the output port ON/OFF state, and the external signals.

8. A monitor device for a control system for monitoring operational conditions of an apparatus comprising a control section and a controlled section having predetermined media transferred therethrough and having sensors for sensing transfer of the media, the control section and the controlled sections being connected together via serial lines, said control section indicating control targets and contents to said controlled section via said serial lines, the controlled section returning at least outputs from said sensors to the control section via said serial lines, the monitor device comprising:

input means for receiving inputs of the output signals from the sensors transmitted from said controlled section via said serial lines and converting them into parallel signals;

storage means for receiving the serial signals from the sensors transmitted from said controlled section via said serial lines and storing it as the parallel signals;

display means for providing predetermined displays based on the signals stored in said storage means;

specification means for specifying on the display means at least either a desired sensor or measuring range; and control means for providing control such that an inclination of the medium, an interval between the media, a time required for the medium to pass, and a time required for a transfer between the sensors are calculated and displayed on said display means based on variations in the output of the sensor when one or more media are transferred through a position of the sensor specified by said specification means.

9. A monitor device for a control system according to claim 8, wherein said control means provides control such that at least the inclination of the medium, the interval between the media, the time required for the medium to pass, or the time required for a transfer between the sensors are calculated and displayed on said display means, by detecting a position between a measurement start position and a measurement end position within said measurement range where an output from the one sensor specified by said specification means changes from light to dark or dark to light and then detecting a position where another sensor changes from light to dark or dark to light to determine a time difference between these positions.

10. A monitor device for a control system for monitoring operational conditions of an apparatus comprising a control section and a controlled section that are connected together via serial lines, said control section indicating control targets and contents to said controlled section via said serial lines, the controlled section returning its conditions to the control section via said serial lines, the monitor device comprising:

transmission means for transmitting from said control section commands for controlling the controlled section and transmitting responses from the controlled section to the control section;

input means for receiving inputs of serial signals transmitted from said control and controlled sections via said serial lines and of the command and response signals transmitted by said transmission means via said serial lines and converting these signals into parallel signals;

storage means for receiving inputs of predetermined signals transmitted from said control and controlled sections via said serial lines and storing said parallel signals therein;

display means for providing predetermined displays based on the signals stored in said storage means;

specification means for specifying a command and a response to be retrieved; and control means for providing control such that the command and response specified by said specification means are retrieved from said storage means and such that time zone data including a point of time when the command or the response was transmitted is displayed on said display means.

11. A monitor device for a control system according to claim 10, further having trigger detecting means for detecting that the command and response specified by said specification means have been transmitted, based on the contents stored in said storage means, wherein:

said controls means provides control such that the storage of the parallel signals in said storage means is stopped due to the fact that said trigger detecting means detects that the command and response specified by said specification means have been transmitted.

* * * * *